(12) United States Patent
Dumas

(10) Patent No.: US 10,922,937 B2
(45) Date of Patent: Feb. 16, 2021

(54) METHODS AND APPARATUS TO LOCATE AND TRACK MOBILE DEVICE USERS FOR SECURITY APPLICATIONS

(71) Applicant: Wireless Guardian, Inc., Santa Monica, CA (US)

(72) Inventor: Julio Jason Dumas, Santa Monica, CA (US)

(73) Assignee: WIRELESS GUARDIAN, INC., Santa Monica, CA (US)

( * ) Notice: Subject to any disclaimer, the term of this patent is extended or adjusted under 35 U.S.C. 154(b) by 0 days.

(21) Appl. No.: 16/202,010

(22) Filed: Nov. 27, 2018

(65) Prior Publication Data

US 2019/0244498 A1    Aug. 8, 2019

Related U.S. Application Data

(60) Provisional application No. 62/591,722, filed on Nov. 28, 2017.

(51) Int. Cl.

| | |
|---|---|
| G08B 13/19 | (2006.01) |
| G08B 13/196 | (2006.01) |
| H04W 4/029 | (2018.01) |
| G06K 9/00 | (2006.01) |
| H04W 4/02 | (2018.01) |
| H04W 84/12 | (2009.01) |
| H04L 29/12 | (2006.01) |

(52) U.S. Cl.
CPC ... *G08B 13/19656* (2013.01); *G06K 9/00288* (2013.01); *H04W 4/023* (2013.01); *H04W 4/029* (2018.02); *H04L 61/6022* (2013.01); *H04W 84/12* (2013.01)

(58) Field of Classification Search
CPC .................. G08B 13/19656; H04W 4/029
See application file for complete search history.

(56) References Cited

U.S. PATENT DOCUMENTS

| | | | |
|---|---|---|---|
| 2014/0195102 A1* | 7/2014 | Nathanson | G07C 5/0808 701/31.4 |
| 2015/0054639 A1* | 2/2015 | Rosen | G06K 9/00785 340/439 |
| 2017/0374528 A1* | 12/2017 | Bolon | H04W 4/021 |
| 2018/0367943 A1* | 12/2018 | Pipes | H04W 4/90 |

* cited by examiner

*Primary Examiner* — Girumsew Wendmagegn
(74) *Attorney, Agent, or Firm* — Perkins Coie LLP

(57) ABSTRACT

A disclosed security system can identify security threats such as terrorists, criminals or persons-of-interest visiting public venues such as airports, stadiums, hospitals, embassies, convention centers or arenas. The security system may integrate a wireless device tracking system, a server system, and a camera system. The wireless device tracking system may track and locate wireless device carried by a person or carried in a car as the person is visiting a venue. The camera system may include facial recognition technology to identify persons listed on a law enforcement watch list. The camera system may also include thermal imaging capabilities to identify whether a person is carrying a weapon. The information obtained from the wireless device tracking system and the camera systems can be processed by the server system to identify suspected threats in proximity to the venue.

17 Claims, 12 Drawing Sheets

METHODS AND APPARATUS TO LOCATE AND TRACK MOBILE DEVICE USERS FOR SECURITY APPLICATIONS

PRIORITY CLAIMS AND RELATED PATENT APPLICATIONS

This patent document claims the priority to and the benefits of U.S. Provisional Application No. 62/591,722 entitled "METHODS AND APPARATUS TO LOCATE AND TRACK MOBILE DEVICE USERS FOR SECURITY APPLICATIONS" filed by Applicant Wireless Guardian Company on Nov. 28, 2017, which is incorporated by reference as part of this patent document.

TECHNICAL FIELD

This patent document relates to systems, methods, and devices for using wireless communications, facial recognition, and object recognition technologies for security applications.

BACKGROUND

Safety of people and security of various establishments, premises, or venues are important and there have been increasing demands for ensuring security at venues such as private properties, corporate campuses and building, school campuses, towns and cities, parks, airports, stadiums, hotels, schools and hospitals. A premise or venue can be equipped with security systems that allow security personnel to protect the public as they visit such venues. The security systems installed at such venues may include metal detectors, cameras, X-Ray screening systems, and body scanners. As an example, a metal detector located at the entrance of a venue can be used to determine whether a person visiting the venue is carrying any weapons. Such security systems are located at the venue and can be used to identify security threats at the venue.

SUMMARY

The technology disclosed in this patent document can be implemented to provide enhanced security monitoring by integrating different monitoring and tracking technologies into a security system. An exemplary security system can provide a layered security network by using various technologies such as wireless communication, facial recognition, thermal imaging for weapons detection, or object recognition. An example of a layered security network may include a first protective zone or a first area that can be monitored by a wireless device tracking system, a second protective zone or a second area that can be monitored by the wireless device tracking system and a camera system, and a third protective zone or a third area that can be monitored by venue security acting on the information obtained by the wireless device tracking system and the camera system. A benefit of using a layered security network is that the exemplary security system can proactively identify a person as a potential security threats before a person enters a venue.

An exemplary embodiment discloses a security system to track one or more mobile devices. The security system comprises a telemetry system, a digital system, a camera system, and a server system. The telemetry system includes antennas to transmit and receive wireless signals to locate and track a mobile device. The digital system includes wireless access points to wirelessly communicate with the tracked mobile device to obtain identification information (e.g., MAC address). The camera system obtains an image of a person carrying the tracked mobile device. The server system communicates with the telemetry system, the digital system, and the camera system. The server system is also configured to determine, based on the transmitted and received wireless signals, a location of the mobile device at or near a venue, process the identification information of the tracked mobile device to determine an attribute associated with a potential suspect, obtain, from the camera system, the image of the person carrying the tracked mobile device, and analyze the obtained image to identify the person as a potential suspect.

Another exemplary embodiment discloses a method of tracking one or more mobile devices. The method comprises determining one or more available frequencies to transmit and receive wireless signals, transmitting and receiving wireless signals using the one or more available frequencies to detect one or more antennas associated with a mobile device, determining a location of the mobile device, processing an identification information obtained from the mobile device to determine an attribute associated with a potential suspect, obtaining an image of a person carrying the mobile device, and analyzing the obtained image to identify the person as a potential suspect.

Another exemplary embodiment discloses a security system, comprising a telemetry system, a digital system, a camera system, and a server system. The telemetry system, comprises: a first antenna configured to transmit a first antenna detection signal and to receive a first reflected signal from a wireless antenna of a mobile device; a second antenna configured to transmit a second antenna detection signal and to receive a second reflected signal from the wireless antenna of the mobile device; a first set of telemetry antennas configured to receive the first reflected signal; and a second set of telemetry antennas configured to receive the second reflected signal. The digital system comprises wireless access points and configured to wirelessly communicate with the mobile device to obtain identification information of the mobile device. The camera system comprises one or more cameras to obtain an image of a person carrying the mobile device. The server system is in communication with the telemetry system, the digital system, and the camera system, where the server system configured to: determine a first set of available wireless frequencies to use for the first antenna and the first set of telemetry antennas; transmit the first antenna detection signal using the first antenna and the first set of available wireless frequencies; receive the first reflected signal using the first antenna and the first set of telemetry antennas; determine a second set of available wireless frequencies to use for the second antenna and the second set of telemetry antennas; transmit the second antenna detection signal using the second antenna and the second set of available wireless frequencies; receive the second reflected signal using the second antenna and the second set of telemetry antennas; calculate a location of the mobile device in response to receiving the first reflected signal or the second reflected signal; collect, using the wireless access points, the identification information from the mobile device; process the identification information of the mobile device to identify potential suspects; obtain, from the camera system, the image of the person carrying the mobile device; and analyze the obtained image to identify the person as a potential suspect.

In some embodiments, the server system is further configured to: obtain a location of the person from the image obtained by the one or more cameras; and in response to determining, at multiple instances in time, that the calculated location of the mobile device is same as or is within a predetermined value of the location obtained from the image: record, using the camera system, the location of the person that continues to appear in a field of view of the one or more cameras.

In some embodiments, the camera system includes a thermal camera or thermal cameras configured to obtain a thermal image of the person located in the thermal camera's field of view, and the server system is further configured to analyze the thermal image to detect a weapon located on the person.

In some embodiments, the location of the mobile device is calculated using the first reflected signal by the server system configured to: measure, using a first signal generator, a first signal strength indicator of the first antenna detection signal at a predetermined distance from a first transmitter of the first antenna; measure, using the first signal generator, a second signal strength indicator of the first reflected signal; and determine the location of the mobile device using the first and the second signal strength indicators measured by the first signal generator. In some embodiments, the location of the mobile device is calculated using the second reflected signal by the server system configured to: measure, using a second signal generator, a first signal strength indicator of the second antenna detection signal at a predetermined distance from a second transmitter of the second antenna; measure, using the second signal generator, a second signal strength indicator of the second reflected signal; and determine the location of the mobile device using the first and the second signal strength indicators measured by the second signal generator.

In some embodiments, the server system is further configured to determine that the person is carrying more than one mobile device. In some embodiments, the attribute associated with the potential suspect include the tracked mobile device being identified as a disposable device. In some embodiments, the identification information of the mobile device includes information obtained from a media access control (MAC) address of the mobile device. In some embodiments, the calculated location of the mobile device within three feet of actual location of the mobile device.

In some embodiments, the server system is configured to analyze the obtained image by performing facial recognition on the image of the person carrying the tracked mobile device.

In some embodiments, the camera system provides a location of the person that appears in a field of view of one or more cameras associated with the camera system, and the server system is further configured to: determine, at different instances, the determined location of the mobile device being same or similar to the location of the person provided by the camera system; and track, using the camera system, the person that continues to appear in the field of view of the one or more cameras. In some embodiments, the person may be tracked by using the camera system to record the location of the person that continues to appear in a field of view of the one or more cameras.

In some embodiments, the mobile device is a Wi-Fi capable device. In some embodiments, the telemetry system and digital system are configured to operate in a first security protective zone, the camera system is configured to operate in a second security protective zone, and the second security protective zone is located inside the first security protective zone.

These and other aspects and features are described in greater detail in the drawings, the description and the claims.

DETAILED DESCRIPTION

Figure 1:
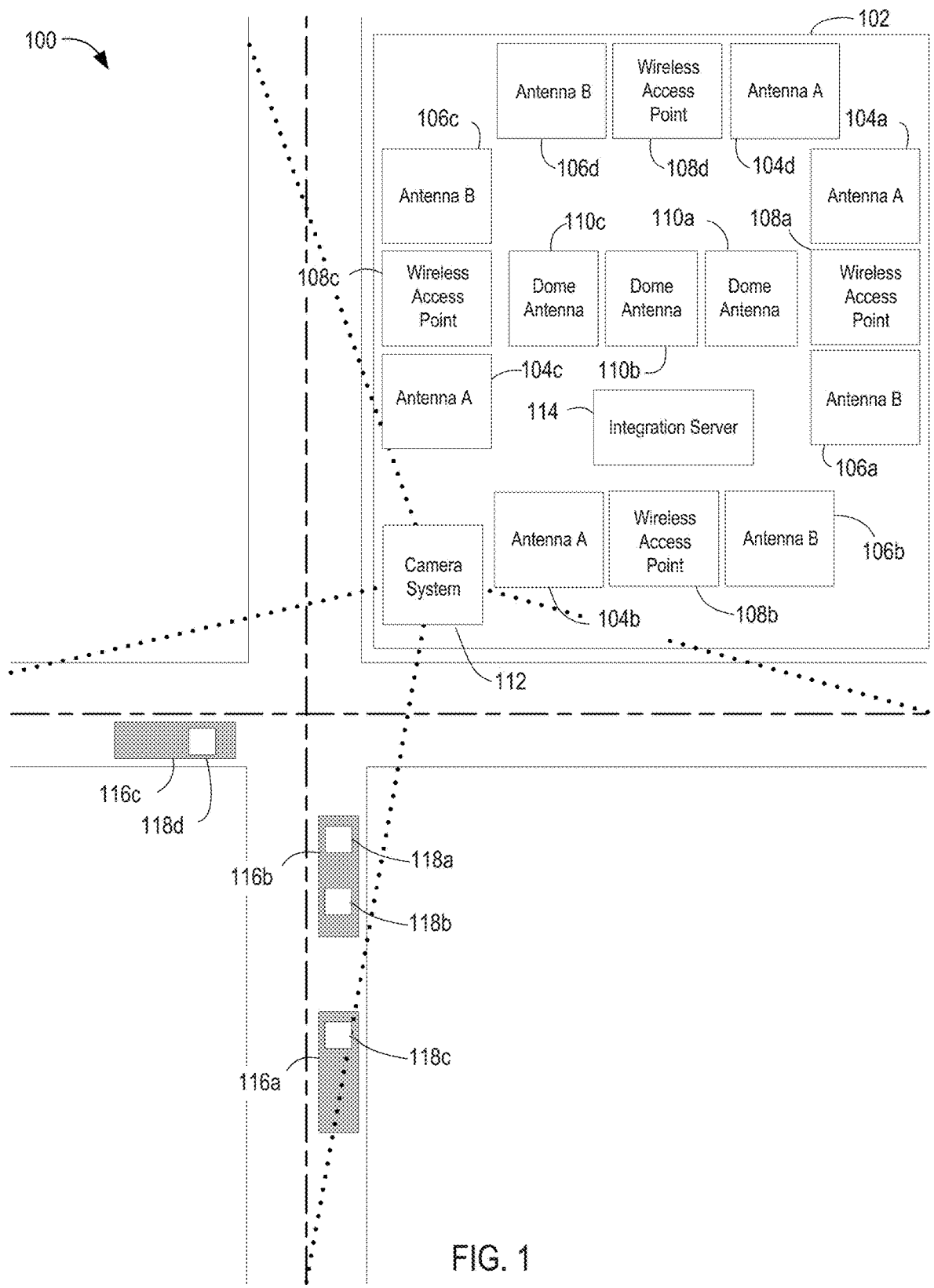
FIG. 1 illustrates an embodiment for an exemplary security system.

The disclosed technology in this patent document can be used to construct a security system that includes a wireless device tracking system, a server system, and an imaging system (e.g., a camera system) in a layered security network and can operate those systems to obtain and process data to provide useful information for security. This patent document first describes an example of a wireless device tracking system that can monitor a first area to provide security, which can be referred to as a first protective zone. Next, this patent document discloses an example of a server system that can receive and process information from the wireless device tracking system and a camera system. In addition, an example of a camera system is described that can operate with the wireless device tracking system to monitor a second area to provide security, which can be referred to as a second protective zone. In some embodiments, a third protective zone can be monitored by the wireless device tracking system, the camera system, and security personnel acting on the information provided by the exemplary security system. An exemplary configuration of the layered security network includes protective zones that are nested within each other. For example, the second protective zone may be located within the first protective zone, and the third protective zone may be located within the second protective zone.

An example of a wireless device tracking system based on the disclosed technology can include a telemetry system (also known as radar system). The telemetry system includes antennas at known locations at a venue or a premise and capable of communicating with mobile devices within the system's wireless coverage range to locate and track the mobile devices carried by people visiting the venue or the premise. Examples of mobile devices carried by people include mobile devices physically located on a person or mobile devices located in a vehicle driven by a person. The wireless device tracking system can also include a digital system that includes wireless access points at known locations at a venue or a premise to wirelessly communicates with the tracked mobile device to obtain identification information (e.g., MAC address). In an exemplary embodiment, when a person carrying a mobile device visits a venue or a premise and the mobile device is located within a wireless range of the wireless access points, the wireless access points can achieve a soft handshake with the mobile device to download identification information from such a device. The downloaded identification information can include, for example, Media Access Control (MAC) address, public Internet Protocol (IP) address, Identifier for Advertisers (IDFA), or other information retrieved from the wireless devices. The downloaded MAC addresses have identifiers that can be combined with third party information to determine whether a wireless device is a disposable mobile device. Information about disposable mobile devices can be helpful to security personnel since disposable phones are more likely to be used for criminal activity. As further explained in this patent document, information from the downloaded data can be cross-referenced with a list of potential threats provided by local or federal law enforcement officials.

The wireless range of the wireless device tracking system can be used to identify potential security issues before a person arrives at a venue and while the person is within the system's wireless coverage range. Thus, a wireless device tracking system can be used to identify potential security threats prior to other security systems, such as the camera system. The mobile devices may include Wi-Fi capable phones, computers, Wi-Fi capable automobiles, transponders, corporate identification tags, drones, smart vehicles, RFID tags, Block Chain infrastructure, 5G services, or Internet of Things (IoT) devices. In an exemplary embodiment, the wireless device tracking system can locate a mobile device within the system's wireless range to approximately three feet of the actual location of the mobile device.

The security system also includes a camera system that can obtain images, still images or video images, to provide images of a person or a vehicle to identify the person or vehicle, and, in addition, relying on the locations associated with the images, to also locate the person or vehicle. For example, in some implementations, the camera system may include location-aware cameras that can be located or placed at various known locations or places in and around the venue to provide the location information for the captured images. The location-aware cameras can track moving objects by their locations to allow security personnel to track potential targets around a venue or premise. The camera system can also include analytic software such as facial recognition software to provide facial recognition.

This patent document also describes a server system that can integrate the various systems described in this patent document. For example, the server system can compare the location information of a person obtained by the one or more cameras with the location information of one or more mobile devices carried by that person and obtained by the wireless device tracking system to determine that the same person is being tracked by both systems so that additional security operations may be performed using the information obtained by the camera system. In one implementation, the server system can compare the first location information obtained by the camera system with the second location information obtained by the wireless device tracking system to determine that the two locations are same or similar (e.g., within a certain value of each other). In another implementation, if a server system determines that the location information obtained from the wireless device tracking system for a person carrying a mobile device is the same or similar as the location information obtained from the camera system for the person at multiple instances (e.g., at three separate instances in time), the server system can determine that the same person is being tracked by both the wireless device tracking system and the camera system. When the server system determines that both the wireless device tracking system and the camera system are tracking the same person, the server system can track, follow, capture images, and record information relevant to the security vetting of that person using the camera system.

In some implementations, the security system can be implemented to include analytic software to detect certain objects of interest, such as potential weapons or banned devices, based on thermal imaging capabilities of the camera system by including cameras capable of infrared (IR) or thermal imaging. For example, thermal camera imaging technology can be used to search vehicles, transportation items such as boxes or carts, and pedestrian for weapons. The camera system can include multiple thermal cameras with pan, zoom, and location-aware technologies. The exemplary security system can integrate a wireless device tracking system with a camera system and a server system to provide security for a venue. The video or image feeds from the cameras can be sent to the security terminals for security personnel assessment. The security personnel can use the information obtained from the thermal imaging technology to search for devices, weapons, or liquids.

The exemplary security system can be operated to provide security information before, during, and after an attack on the facility. The various components of the security system, such as the cameras may be resistant to damage from bullets, explosions, vehicles, etc., The damage resistant cameras can also include an on-board battery power, infrared and thermal imaging so that the cameras can provide a video feed in various environments, such as through smoke, explosion, structural damage to the venue, or electricity outage. The cameras may also have other low-light imaging capabilities, such as night vision and/or infrared technologies. The cameras may communicate with and send video feed to the security system using encrypted wireless communication. The cameras system can also provide a remote or offsite terminal operational effectiveness so that offsite security personnel can take over the operations for the onsite security personnel.

The information gathered by various components of the security system can be shared with onsite security personnel in real-time. The exemplary security system can also offer multiple levels of security to access the data at the same time. The security system can allow for multiple users, with multiple target-lists, to access or utilize the system. The security system may include multiple onsite terminals and multiple offsite terminals. Each terminal can utilize its own secure target lists and leverage the system to search for or acquire their targets. This allows security personnel to maintain the confidentiality of a target list.

FIG. 1 illustrates an exemplary embodiment for a security system 100 at a traffic intersection or at a venue. The security system may include at least three systems that are further described in this patent document: (i) a wireless device tracking system that includes the various antennas and wireless access points shown in FIG. 1; (ii) a server system that includes the integration server 114; and (iii) a camera system 112. The security system can operate the wireless device tracking system and the server system to track and/or locate the mobile devices 118a-118d located in vehicles 116a-116c or carried by people visiting the venue. Some of the systems or components of the security system 100 may be installed on a support structure 102, such as a cell tower, building wall or structure, a mobile phone mast, or a base station. For instance, the antennas and wireless access points shown in FIG. 1 may be installed on the support structure 102. Some of the systems or components of the security system 100 may be installed on a support structure 102 at or near the venue.

I. Wireless Device Tracking System

The security system 100 includes a wireless device tracking system that may include sub-systems that operate together to track mobile devices and to obtain and analyze security related information related to the mobile device users. The process of determining location may occur via multilateration of radio signals between antennas of the network and the mobile device, or via global positioning system (GPS). Multilateration is a technique based on the measurement of the difference in distance to three stations at known locations by broadcast signals at known times. One of the sub-systems of the wireless device tracking system is a telemetry or radar system that can locate and track multiple mobile devices, and another sub-system is a digital system that can wirelessly communicate with the tracked mobile devices using, for example, Wi-Fi, Bluetooth, or 5G signals. The exemplary details of each of these sub-systems are further described below.

(a) Telemetry System

The wireless device tracking system includes a telemetry system that may include three antennas 110a, 110b, and 110c, a first set of telemetry antennas 104a-104d, and a second set of telemetry antennas 106a-106d. The three antennas 110a, 110b, and 110c are mounted on the support structure 102. In some embodiments, two antennas 110a and 110b may be used in the wireless device tracking system and may be mounted on opposite sides of the support structure. In an exemplary embodiment, one of the antennas 110a may be a dielectric lens antenna operating in the 60 GHz range. Antennas 110b and 110c may be a parabolic or spherical lens antenna operating in the 2.4 GHz and/or 5 GHz range. The telemetry system allows the antennas 110a, 110b and/or 110c to periodically transmit antenna detection signals to the mobile devices located within the transmission range of the antennas 110a, 110b, and/or 110c. In some embodiments, a single antenna may be used and mounted on the support structure. The single antenna may operate in the 100 MHz (RFID), 600 MHz (5G), 700 MHz (4G), 850 MHz (4G), 1900 MHz (4G), 2100 MHz (4G), 2.4 GHz (Wi-Fi), 2500 MHz (Bluetooth) 2600 MHz (5G), 5 GHz (Wi-Fi), and 60 GHz range.

As shown in FIG. 1, a first set of telemetry antennas 104a-104d (Antennas A) and a second set of telemetry antennas 106a-106d (Antennas B) may be mounted on the support structure 102. Each set of telemetry antennas may be mounted on four sides of the support structure so that each telemetry antenna from one set is located approximately 90 degrees from another telemetry antenna from the same set. The first set of telemetry antennas 104a-104d is configured to receive the first set of reflected signals from mobile devices 118a-118d. The second set of telemetry antennas 106a-106d is configured to receive the second set of reflected signals from mobile devices 118a-118d. As explained in this patent document, the set of reflected signals may be received at least due to the multiple mobile devices 118a-118d sending back the reflected signals in response to receiving the antenna detection signal. In some embodiments, the first set of telemetry antennas 104a-104d is configured to receive a first reflected signal from a mobile device and/or the second set of telemetry antennas 106a-106d is configured to receive the second reflected signal from the same mobile device.

The antennas in the telemetry system and the wireless access points operate in the unlicensed frequency range. The first antenna 110a broadcasts and receives wireless signals in the 60 GHz range. The second and/or third antenna 110b, 110c and the wireless access points 108a-108d broadcast and receive wireless signals in the 2.4 GHz and/or 5 GHz range. Each of the first set of telemetry antennas 104a-104d (Antennas A) can receive wireless signal at a wireless frequency of about 60 GHz, and each of the second set of telemetry antennas 106a-106d (Antennas B) can receive wireless signals at wireless frequencies ranging from 2.4 GHz to 2.5 GHz and/or from 5.15 GHz to 5.85 GHz.

Figure 2:
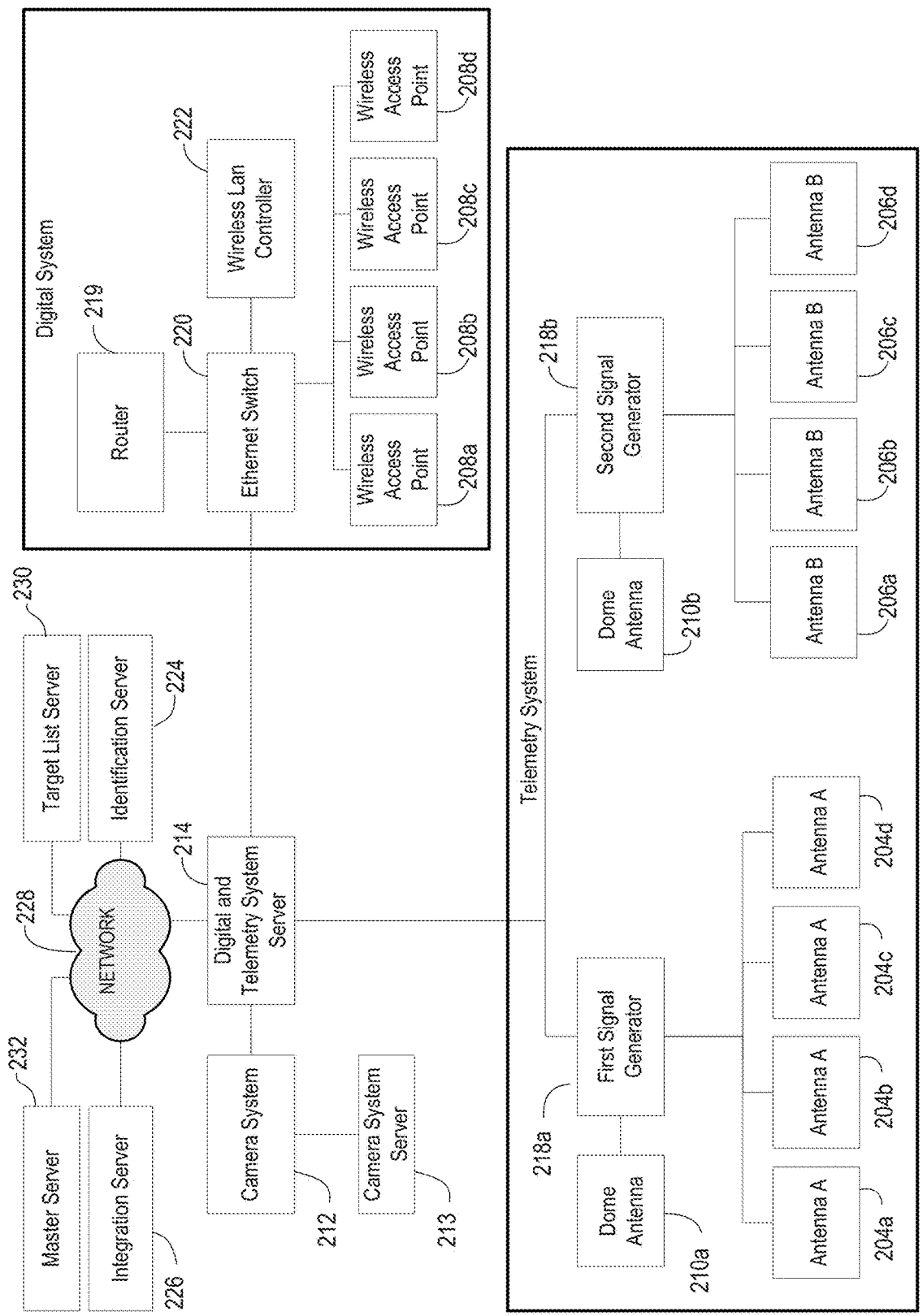
FIG. 2 illustrates a block diagram of an exemplary security system.

FIG. 2 illustrates an exemplary block diagram of a security system. The various components shown in FIG. 1 are shown in FIG. 2. The telemetry system allows the antennas 210a and 210b to periodically transmit antenna detection signals to the mobile devices located within the transmission range of the antennas 210a and 210b. The antenna detection signals may include, for example, a time domain pulse signal, pulse repetition frequency (PRF) (Pulse Doppler Radar), or continuous wave radar (unmodulated and modulated frequencies). The antenna detection signals are received by wireless antennas in mobile devices. Subsequently, reflected signals from the wireless antennas are sent back to the antennas 210a and 210b. The reflected signals may also be received by the telemetry antennas 204a-204d and 206a-206d. The reflected signals are analyzed by the digital and telemetry system server 214 to locate and track the mobile devices.

As shown in FIG. 2, a digital and telemetry system server 214 is communicably coupled to or is electrically connected to the first signal generators 218a, the second signal generator 218b, the ethernet switch 220, the router 219, and the camera system 212. The first signal generator 218a is connected to the first antenna 210a and to the first set of telemetry antennas 204a-204d. The second signal generator 218b is connected to the second antenna 210b and to the second set of telemetry antennas 206a-206d. Thus, the digital and telemetry system server 214 is communicably coupled to or is electrically connected to the first and second antennas, and the first set of and second set of telemetry antennas via the respective signal generators. The first signal generator may operate over a frequency range of 2 GHz to 67 GHz, and the second signal generator may operate over a frequency range of 1 MHz to 6 GHz.

As further explained in this patent document, the digital and telemetry system server 214 can determine, using the first signal generator 218a, the first set of available wireless frequencies to use for the first antenna 210a and the first set of telemetry antennas 204a-204d. The digital and telemetry system server 214 instructs the first signal generator 218a to periodically generate the first antenna detection signal using the first set of available wireless frequencies. The first antenna 210a coupled to the first signal generator 218a periodically transmits the periodically generated first antenna detection signal. The first antenna detection signal may be transmitted between 100 to 1000 times per minute. When the first antenna detection signal is transmitted, the first signal generator 218a measures a first signal strength indicator of the first antenna detection signal at a predetermined distance from a first transmitter of the first antenna 210a.

When the first antenna 210a periodically transmits the first antenna detection signal, the first antenna detection signal reaches the wireless antennas on mobile devices within range and bounces back as reflected signals. The first antenna 210a and the first set of telemetry antennas 204a-204d are configured to receive a first set of reflected signals from the mobile device's wireless antennas. The first signal generator 218a is configured to receive the first set of reflected signals from wireless antennas in the mobile devices. When the first set of reflected signals is received, the first signal generator 218a measures a second signal strength indicator of each of the first set of reflected signals.

The digital and telemetry system server 214 determines the location of the plurality of mobile devices using the first and the second signal strength indicators measured by the first signal generator 218a. The digital and telemetry system servers 214 may use Equation 1, shown below, to calculate location of the plurality of mobile devices:

$$RSSI[dBm] = -(10 * n * \log_{10}(d) + A[dBm]) \quad \text{(Eq. 1)}$$

where A is the measured first signal strength indicator at one meter of distance, RSSI is the measured second signal strength indicator, n is the propagation path loss exponent, and d is the distance of a mobile device from antennas 210a or 210b or the telemetry antennas. The values for n can be chosen or pre-determined based on the following table:

TABLE 1

Values for the Propagation Path Loss Exponent

| n | Environment |
|---|---|
| 2.0 | Free space |
| 1.6 to 1.8 | Inside a building, line of sight |
| 1.8 | Grocery store |
| 1.8 | Paper or cereal factory building |
| 2.09 | A typical 15 m x 7.6 m conference room with table and chairs |
| 2.2 | Retail store |
| 2 to 3 | Inside a factory, no line of sight |
| 2.8 | Indoor residential |
| 2.7 to 4.3 | Inside a typical office building, no line of sight |

The digital and telemetry system server 214 is communicably coupled to or electrically connected to the plurality of wireless access points. The digital and telemetry system server 214 may determine, using the plurality of wireless access points 208a-208d, the second set of available wireless frequencies to use for the second antenna 210b and the second set of telemetry antennas 206a-206d. The digital and telemetry system server 214 instructs the second signal generator 218b to periodically generate the second antenna detection signal using the second set of available wireless frequencies. The second antenna 210b coupled to the second signal generator 218b periodically transmits the periodically generated second antenna detection signal. The second antenna detection signal may be transmitted between 100 to 1000 times per minute. When the second antenna detection signal is transmitted, the second signal generator 218b measures a first signal strength indicator of the second antenna detection signal at a predetermined distance from a second transmitter of the second antenna 210b.

When the second antenna 210b periodically transmits the second antenna detection signal, the second antenna detection signal reaches the wireless antennas on mobile devices within range and bounces back as reflected signals. The second antenna 210b and the second set of telemetry antennas 206a-206d are configured to receive a second set of reflected signals from the mobile device's wireless antennas. The second signal generator 218b is configured to receive the second set of reflected signals from wireless antennas in the mobile devices. When the second set of reflected signals is received, the second signal generator 218b measures a second signal strength indicator of each of the second set of reflected signals.

The digital and telemetry system server 214 determines the location of the plurality of mobile devices using the first and the second signal strength indicators measured by the second signal generator 218b. The digital and telemetry system servers 214 may use Equation 1 (discussed above) to calculate location of the mobile devices. The telemetry system can determine the location of a mobile device within approximately three feet of the actual location of the mobile device. The telemetry system can store location information collected by the digital and telemetry system server 214 during the time that the wireless device is being tracked.

As the telemetry system may receive information back from transmitting the antenna detection signal, on each of its multiple antennas, the values are run through algorithms to define their individual distance from the device, at multiple angles, at multiple frequencies, and for things such as cars, cell phones, internet of things (IoT) devices that bounces back a reflected signal. The digital and telemetry system server 214 utilizes fall-off algorithms to drop the weakest information about a tracked wireless device. One benefit of using fall-off algorithms is that it can drastically improve quality control. The security system including the digital and telemetry system server 214 can track multiple wireless devices' movements to determine locations of the wireless devices. The digital and telemetry system server 214 can also determine the timing of the signals, such as round-trip timing, to determine the device location.

The information related to the first and second antenna detection signals and the first set of and second set of reflected signals are received by the telemetry antennas and antennas 210a and 210b, and processed by the digital and telemetry system server 214 to detect one or more antennas on at least one mobile device. Further, the frequencies are analyzed by the digital and telemetry system server 214, and similar return values (e.g., signal measurements or determined values) are pooled together and classified as the same device. The system makes it possible to distinguish moving target in the presence of echoes from the stationary objects. The digital and telemetry system server 214 compares the received echoes with those received in previous sweep. The echoes from stationary objects will have same phase and hence can be cancelled, while moving targets may have some phase change. If the shifted echo coincides with any of the frequency components in the frequency domain of the received signal, the digital and telemetry system server 214 may not be able to measure target velocity. Such velocities are called blind speeds.

When the digital and telemetry system server 214 determines that multiple frequencies show the same object, occupying the same space (i.e., same location), then digital and telemetry system server 214 pools together or combines the values to further analyze whether the two objects very close together, or the same object. The digital and telemetry system server 214 includes a location module that works with the basic location services of the wireless access points 208a-208d. This allows the digital and telemetry system server 214 to determine how many mobile devices are being tracked with the telemetry system. As further described in this patent document, the digital and telemetry system server 214 may generate a system marker for each mobile device that it tracks. The system marker may be a file with a unique identifier as a file name and may include information such as date and time of the session. The system marker for each tracked mobile device can be stored under the mobile device's MAC address or a unique identifier. Further, the basic location services can also allow the digital and telemetry system server 214 to properly assign the system marker. The basic location services of the wireless access points are the location abilities of the digital system. The tracked mobile device can send its RSSI to the wireless access points, so that the digital and telemetry system server can determine the location of the mobile device based off of the mobile device's RSSI. The digital and telemetry system server 214 may recognize that it is tracking a mobile device in same space or time with both the digital system and the telemetry system, and the information from both of these systems show a mobile device in the same space or time so the proper information can be saved to the system marker.

The advantages of choosing wireless fidelity (Wi-Fi) for location-based services are high compatibility, frequency availability, and the widespread use of Wi-Fi in mobile devices that allow for signals to more easily travel through obstruction like door, walls, and vehicles.

The telemetry system can determine whether a mobile device, and thus, a person or vehicle carrying the mobile device, is stationary. For example, if a mobile device user is sitting still, the same data for the antenna detection signal and the reflected signals will be received by the system. When the system recognizes this, it can overwrite the bread crumb information (e.g., continuous location information) associated with that user's mobile device in the system marker. When this begins, the system timer of the digital and telemetry system server 214 can track how long an object stays still. Such tracking information can be stored on the system marker by the digital and telemetry system server 214. The system marker can be stored under the folder specific to a unique identifier of the tracked device, such as a MAC address. The system marker may be stored locally on the digital and telemetry system server 214, the local server, and the host server for the network. The system marker related information may also be stored on another digital and telemetry system server located off-site.

In FIG. 1, the telemetry antennas 104a-104d and 106a-106d can be full range antennas that allow the telemetry system to utilize the broadcasting frequencies, such as those related to mobile carriers, of the devices that pass by. This data is combined with the data obtained by the telemetry system to optimize the system and locate the device with these broadcasts. In some embodiments, the mobile device frequencies are received and processed as continuous wave frequencies and run through the same calculations as the antenna detection signal operation to determine their location and tie together devices on the digital system and devices on the telemetry system.

The telemetry system related data can be stored for six months on a digital and telemetry system server. If the local digital and telemetry system server has stored a system marker for a mobile device it tracked but has not obtained any tracking information about the same device for more than six months, then that mobile device's information is moved to archive storage such as an offsite server. The system marker information for the mobile devices that pass through the telemetry system periodically (e.g., every day) can be stored locally for quick and easy access. The digital and telemetry system server 214 can communicate with one or more servers for global system control.

(b) Digital System

The wireless device tracking system includes a digital system that comprises wireless access points 108a-108d. The wireless access points 108a-108d may be mounted on the support structure 102. The wireless access points 108a-108d may be located on four sides of the support structure so that each wireless access point is located approximately 90 degrees from another wireless access point. Each of these wireless access points can have approximately a half mile radius of coverage at full power. The wireless access points can utilize both hidden and public service set identifiers (SSIDs). The settings related to SSID and power levels may be dynamically controlled by the digital and telemetry system server through a router.

The wireless access points 108a-108d are configured to transmit wireless signals to and receive wireless signals from mobile devices 118a-118d. In some embodiments, the wireless signals transmitted and received by the wireless access points can be wireless fidelity (Wi-Fi) signals operating using IEEE 802.11 standard in the 2.4 GHz and/or 5 GHz range. Further, the wireless access points 108a-108d monitor the surrounding environment and recognize the channels or frequencies being used by the surrounding networks. The wireless access points 108a-108d operate in the unlicensed frequency range.

In some embodiments, the wireless access points can maintain the data offload initiative and the voice over Wi-Fi (VoWiFi) guidelines. One benefit of having wireless access points with these features is that a user's mobile device identifies the exemplary wireless access points as enterprise quality and increases its wireless antenna power to maintain connection with the wireless device tracking system. Another benefit of the exemplary wireless access points is that the mobile device can use them as an alternative backhaul source if their primary sources, such as a cellphone tower or other wireless sources, are degraded.

FIG. 2 shows an example of the interconnection between the wireless access points and various other components. As shown in FIG. 2, the wireless device tracking system also includes an ethernet switch 220 connected to a router 219, a wireless LAN controller 222, and the wireless access points 208a-208d. The router 219 is configured to control functions of the ethernet switch 220. For example, the router 219 may be used to communicate with the ethernet Switch to control splash page generation, splash page integration, channel control, or user control for one or more mobile devices. The wireless LAN controller is configured to store certificate and authentication information for the plurality of wireless access points. The wireless access points 208a-208d may be connected, through software developer's kit (SDK), to the digital and telemetry system server 214. The digital and telemetry system server 214, through SDK, may constantly monitor, manipulate, and extract information from the wireless access points through both the router and wireless LAN controllers. The wireless device tracking system may also include a plurality of power converters configured to send power over Ethernet to the plurality of wireless access points. Each power converter may be connected in series between the ethernet switch and one of the wireless access points. Each power converter includes an input Ethernet connector connected to an Ethernet port on the ethernet switch and an output Ethernet connector connected to a power-over-Ethernet input of one of the access points.

The disclosed technology can use an SDK in the digital and telemetry system server 214 to actively query the wireless access points 208a-208d for the open channels or frequencies. The digital and telemetry system server 214 can also use the SDK to pool or combine onto as few channels as possible the wireless access point channels that are used by the mobile devices to wirelessly connect to the wireless access points. One benefit of combining the used channels is to allow for more channels to be used to generate and transmit the antenna detection signal. The digital and telemetry system server 214 can also use the SDK to receive information from the wireless access points 208a-208d regarding the channels or frequencies that are available for the antenna detection signal transmission.

The digital and telemetry system server 214 may control, through an SDK, the wireless access points' ability to control the traffic or channel loading of the system. The logic control of the SDK states that as devices are recognized and processed, it may pool or combine it with other processed devices onto as few channels as possible, leaving open channels or frequencies we can use for the ping. Some channels, or frequency blocks, may be removed from the digital system operation pool so there is at least one open frequency to operate the telemetry system's transmission of the antenna detection signal. This can be done in an ethernet switch 220 graphical user interface (GUI) or controller GUI of the wireless access points.

The disclosed technology monitors the environment using the wireless access points and the first signal generator so that the device tracking system does not broadcast on impeding frequencies being utilized by wireless equipment in neighboring environment. Such impeding frequencies can be temporarily removed from the list of available wireless frequencies. The list of available wireless frequencies may include one or more channels or frequencies. As more frequencies become available, the wireless access point will recognize the presence of one or more available frequencies, and the telemetry system may use the one or more available frequencies to transmit the antenna detection signal. The list of available wireless frequencies may be determined daily to enable accurate information of available frequencies.

The digital and telemetry system server 214 queries the wireless access points to determine what frequencies are open or unused by the wireless access points. An SDK on the digital and telemetry system server 214 may obtain the list of available wireless frequencies from the wireless access points and dynamically uses it in the telemetry system logic control, as discussed above. The list of available wireless frequencies may include one or more frequencies. The digital and telemetry system server 214 may also monitor a number of channels or frequencies that are being used by other wireless antennas or access points not related to the security system but operating in the same environment. One benefit of such monitoring is that it allows the security system to choose as many different frequencies as possible to use for transmitting the antenna device signal. Thus, the digital and telemetry system server 214 can determine a list of available frequencies in the wireless spectrum and may send the antenna detection signal at those frequencies when available.

A wireless access point may connect with a user's mobile device and may achieve a soft handshake. During the soft handshake, the digital and telemetry system server 214 obtains the mobile device's identification information such as MAC address, IDFA, and/or offline website data through the wireless access point. The offline website data is stored in the mobile device and may include cache, history, cookies, and browser history information. For each new tracked device, the digital and telemetry system servers 214 stores the MAC address, IDFA, and offline website data in a system marker that may be identified by the MAC address of the mobile device. If the digital and telemetry system server 214 determines that a user's mobile device has been tracked before (e.g., by finding a system marker associated with the mobile device), then the server 214 obtains the previously stored system marker associated with that mobile device.

The wireless device tracking system also provides the information obtained from the telemetry system to additional systems. As explained in this patent document, the telemetry system can generate location information based on periodic transmission of the antenna detection signals and the reception of the reflected signals that bounce back from the antennas on the mobile devices. Further, based on the information obtained from the reflected signals, the digital and telemetry system server 214 can assign a system marker for a user's movements though the tracking system. Some or all of the location information collected from the telemetry system can be stored in the system marker, where the system marker can be used by other systems associated with the security system of FIG. 1, and/or by one or more additional security systems. In addition, the digital and telemetry system server 214 can obtain historical data for the mobile device if the wireless access point has achieved soft handshake with the same mobile device within a certain historical period.

The digital and telemetry system server 214 may perform additional operations if the digital and telemetry system server 214 determines that the telemetry system and the wireless access points have a match, such as when a mobile device is tracked by the telemetry system and/or when a wireless access point performs soft-handshake with the mobile device. An example of additional operations performed by digital and telemetry system server 214 in response to the matching includes tracking the mobile device and storing the data obtained by the telemetry antennas and wireless access points on a system marker associated with a mobile device. The telemetry system can input the location data for a particular mobile device in that mobile device's system marker. Similarly, the wireless access points obtain information about the mobile device from the soft handshake processes and such information is stored in the system marker associated with that mobile device. The system marker information may be stored in the digital and telemetry system server 214 under the mobile device's MAC address and available for future use.

The information gathered from the wireless access points helps the telemetry system verify the correct MAC address for the devices the telemetry system is tracking. For example, the telemetry system and the digital system can match a mobile device that shows to be in the same or similar space (or determined location) or at the same time. The location information obtained from the telemetry system, and the MAC address obtained from the digital system is stored in the system marker for the session.

Figure 4:
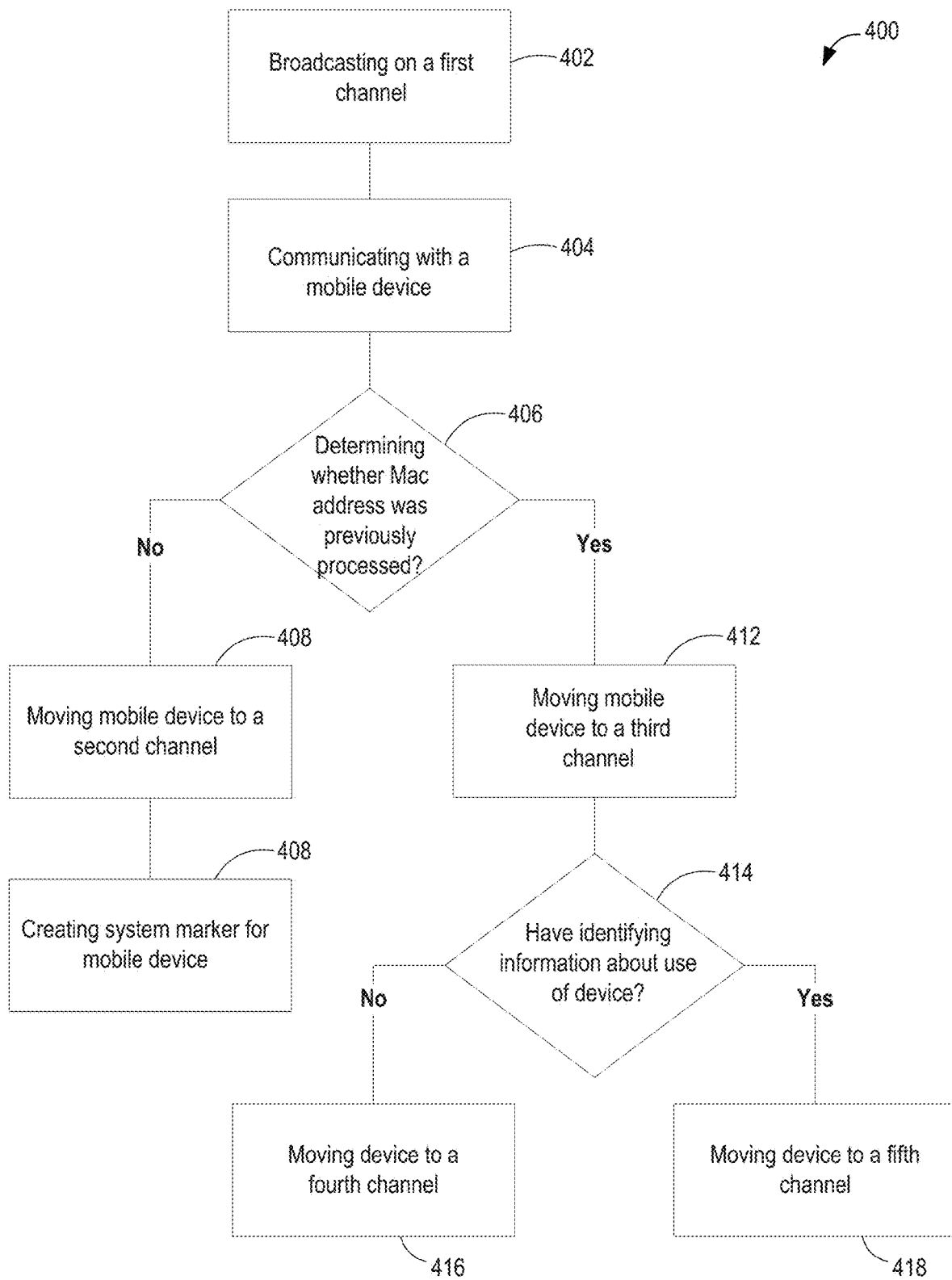
FIG. 4 illustrates an exemplary flowchart for dynamic manipulation of mobile devices.

FIG. 4 illustrates an exemplary flowchart 400 for dynamic manipulation and pooling or combining of mobile devices that wirelessly communicate with the plurality of wireless access points. The dynamic manipulation and pooling feature can optimize channel utilization by combining the mobile devices that wirelessly communicate with the wireless access points. At the broadcasting operation 402, a wireless access point may broadcast a wireless signal on a first channel or a first frequency and may actively seeking connections for any devices that have a Wi-Fi antenna. Each wireless access point may operate on its own wireless channel and may utilize the list of available frequency.

At the communicating operation 404, when a mobile device with MAC address enters the wireless footprint of the wireless access points, one of the wireless access points performs a soft handshake with the device and obtains from the device the MAC address and IDFA information stored in the device or digital or browser files. Once the device's MAC address and information is obtained from the device, this information is passed, for example, through an SDK, to a logic controller in the digital and telemetry system server. The logic controller monitors all MAC address on the first channel. A logic controller such as a Mikrotik Router- BOARD or Mikrotik controllers may be used for serial type interface into the networking functions of the switch.

At the determining operation 406, when a MAC address appears on the first channel, the system queries the digital and telemetry system server or other servers to determine whether that MAC address has been processed before. If the digital and telemetry system server determines that a new device with a MAC address has not previously appeared in the wireless footprint, then the digital and telemetry system server performs the moving operation 408 and the creating operation 410. At the moving operation 408, if the new device with the MAC address has not previously appeared in the wireless footprint, then the digital and telemetry system server may move the new device with the MAC address to a second channel or second frequency. The moving operations, where a device is moved from one channel to another, may be performed by a logic controller in the digital and telemetry system server 214 that gathers information from the ethernet switch. At the creating operation 410, the local controller may create a system marker for the new devices that have not appeared in the security system before. The system marker may include information such as date and time of the session with that device. The system pools or combines MAC address in this way to be able to show all new MAC addresses that the system has processed over a period of time.

If the digital and telemetry system server determines that the device with a MAC address has previously appeared in the wireless footprint, then the digital and telemetry system server performs the moving operation 412 and the determining identifying information operation 414. At the moving operation 412, the digital and telemetry system server may move the device with the MAC address to a third channel or third frequency. The system marker of this device is located and updated with the date and time of the session by the logic controller in the digital and telemetry system server. At the determining identifying information operation 414, the digital and telemetry system server determines whether certain identifying information such as MAC address or digital, web, or browser information was previously received and is on file.

If the MAC address or digital, web, or browser information was not previously received, then the digital and telemetry system server performs another moving operation 416 and moves the device to a fourth channel or fourth frequency. In some embodiments, the fourth channel may contain virtual LANs (VLANs) from 1 to 99,999.

VLAN configurations may be determined by the logic controller assessing the different identifying information and pooling together devices or users that are similar. For example, within the Target List there are different markers that identify different patron types to help follow potential targets. The different markers may include historical data showing a patron as "no issue or green," or showing a patron as "potential target or person of interest," or other description information such as gender, age, clothing, skin color, facial hair, etc., As an example, security personnel can enter into the target list information about a suspicious person such as gender, age, or clothing. The target list information can be stored in a target list server, as described below. As described in the camera system section below, a target tracking module can look for those persons that match the description. For example, if security personnel entered into a target list, "male, red jacket," the security system can use the object and facial recognition technologies described in this patent document to determine every instance of a male with a red jacket within the camera system's field of vision.

As the description information is collected and brought into the logic controller ecosystem, the digital and telemetry system server 214 searches for other similar users inside this wireless device tracking system's footprint. If no other users have the same markers, then the mobile devices may be moved onto a different channel with this information marker. If a channel has already been set-up for this marker information signature, then this new MAC address is added to that existing channel that may contain MAC addresses with matching marker information. Subsequently, the MAC addresses that match a criterion are pooled so appropriate tracking or prioritization can be achieved for devices that pass through the wireless device tracking system footprint. For example, if someone with a red jacket caused a problem at a gate 4, a "be on the lookout" (BOLO) is entered into the security system for a "male with a red jacket." Any instance of a person fitting the description inside the camera's field of vision can be logged by the security system, such as by a digital and telemetry system server or another server depending on secrecy or anonymity protocols. In some embodiments, the MAC addresses of all "males with a red jacket" can be pooled for tracking purposes.

In some embodiments, the server system is configured to provide in real-time location information and target information about each mobile device to onsite security personnel.

If no other MAC address can be pooled together with the MAC address of one of the devices, for example, device A, then a new VLAN is created and the MAC address for device A is added to it. If any other MAC address matches the marker criteria for the MAC address for device A, then the other MAC addresses can be added to this newly created VLAN. This VLAN creation causes a log file to be created that may contain the target or tracking criteria information, MAC address, IP address, channel, location and date or time stamp. This log file may be sent to a PC or server. This information may also be sent to the server or client server, such as onsite Security Company SDK, or Police, FBI, or NSA SDK. With each VLAN creation the system can choose to custom track or follow or records each or any VLAN or SSID or channel configuration it sees fit in order to achieve the goals in the logic controller of the digital and telemetry system server.

If target information was previously synced, then the digital and telemetry system server performs another moving operation 418 and moves the device to a fifth channel or fifth frequency. In some embodiments, the fifth channel may contain VLANs from 1-99,999. VLAN configurations may be determined by the logic controller's ability to assess the different target information, and pool together devices or targets that are similar. If no other MAC address can be pooled together with the MAC address for one of the devices, for example, device A, then a new VLAN is created and the MAC address for device A is added to it. If any other MAC addresses match the marker criteria for the MAC address for device A, then the other MAC addresses can be added to this newly created VLAN. This VLAN creation causes a log file to be created that may contain the target information, MAC address, IP address, channel, location and date or time stamp. This information may be sent to the PC or Server system. This information may also be sent to the server or client server, such as an onsite Venue Security SDK, or Police or FBI or NSA SDK. With each VLAN creation the system can choose to track each or any VLAN or SSID or CHANNEL config it sees fit in order to achieve the goals in the logic controller of the digital and telemetry system server.

One benefit of defining and pooling the MAC address in classifying the target information known about this MAC address, if any, or by pooling similar clients, as described above, is that such operations allow for real-time communication, tracking, or connection or access of data collected for clients or pools of clients. Each IP or VLAN containing real time location information for the devices, the system marker session file, and the user information file, with MAC or IP address, is a request for the client servers. For example, each system marker can be processed by the server and Potential Target information systems. As the system creates and archives these files they are also processed by the local server as an active device. This is then sent to all of our client servers as a request for client operations, such as Target Identification. These requests may be sent through the servers and SDKs and provided to customers. For example, information can be supplied to customers in real time for a Primary Target Apprehension. In another example, information can be supplied to customers (FBI, Police, etc.) in a batch for the hour or day or week or month or year. In another example, information can be supplied to customers across different regions or over different time periods.

All of this data is collected into the system marker file for this session and stored under a device's MAC address or IDFA. The system may pool together archive information into its logic controller associated with how a particular MAC address is pooled or queried by different client servers. The security system may keep relevant information in queue for, for example, 36 months allowing for different client servers to access real-time data in different ways. All data may be stored per the server system configuration.

After the digital and telemetry system server performs the moving operation 418, the digital and telemetry system server can determine whether any of the MAC addresses or VLAN configurations are utilized by the client servers. If they are not utilized, then MAC addresses stay in the same configuration they are now until they are utilized. When connection with the device is lost, the system marker file is updated with the latest date or timestamp and the file is closed. On the other hand, if the MAC addresses or VLAN configurations are utilized by the client servers, then the configuration and client access identification markers are logged onto the system marker for this session. The system maintains this communication until it loses connection with the device. Once connection with MAC address is lost the system marker file is updated with the latest date or timestamp and the file is closed.

The system may utilize an SDK connected to the logic controller containing the system marker files for all of the active devices the system is tracking, and an active pool of the new devices the digital system is processing through the server system. The system's logic controller may be stored in the local rack mounted digital and telemetry system server, may be tasked with pooling the MAC addresses that the digital system is monitoring into different SSIDs or VLANs depending on the device and what the system knows about that device. System may pool MAC address per the information the system knows about the device, and may use both public and hidden SSIDs to achieve its system goals. For example, the hidden SSIDs may be the channels that the mobile devices are moved onto as the system processes them, as described in FIG. 4. In some embodiments, channel 1 may be a public SSID, and channels 2-99 may be hidden and are only available to join when the system moves a mobile device onto those channels. In some embodiments, the moving of mobile devices from one channel to another may be done with a logic controller, for example from Mikrotik, or the Splash Page or Hot Spot Config. System may pool MAC address and per the information the system knows about the device, and utilizes different VLAN channels, under the same SSID, to achieve its system goals. In some embodiments, the digital and telemetry system server controls the ethernet switch operations through the digital and telemetry system server, into the Mikrotik logic controller, into the wireless LAN controller, and into the ethernet switch. Ultimately, the digital and telemetry system server controls the GUI of the switch to achieve the system goals set in the logic controller.

II. Server System

As shown in FIG. 2, the server system of the security system may include a digital and telemetry system server 214, an identification server 224, an integration server 226, a target list server 230, and/or a master server 232. As further described in this patent document, the server system can integrate with a national network (not shown) via the network 228, integrate with the telemetry and digital systems, secure onsite cross referencing of potential threat list, enable security response characteristics desired for venue, provide security output to onsite security, and/or record and replay event timelines for better investigative or defensive measures at the facility. The various modules and features associated with any two or more servers shown in FIG. 2 can be implemented on a same server.

(a) Digital and Telemetry System Server

As discussed in this patent document, the digital and telemetry system server 214 can control the digital system to glean the MAC address and IDFA digital, web or browser or page information marker. The digital and telemetry system server can also control the telemetry system to determine a location of a mobile device to approximately three feet of the actual location of the mobile device. As shown in FIG. 2, the digital and telemetry system server 214 is connected to the network 228, such as Internet or Intranet, and can communicate with the other servers shown in FIG. 2. The digital and telemetry system server 214 can send that information to an identification server 224 or local server that may be located onsite in or near a venue. The digital and telemetry system server 214 can also respond to any query or request from client servers (not shown in FIG. 2).

The digital and telemetry system server 214 queries the digital system, such as the wireless access points to determine a number of frequencies that are open and unused by our digital system or the ambient environment. Additionally, it can monitor the number of channels or frequencies that are being used by other wireless systems close to the security system. The digital and telemetry system server 214 can choose as many different frequencies as possible to use to detect antennas in mobile devices. The digital and telemetry system server 214 can determine a list of available frequencies in the wireless spectrum and may send the antenna detection signal at those frequencies when available.

As described in FIG. 4, the digital and telemetry system server 214 may control, through an SDK, the digital systems ability to control the traffic or channel loading of the system. The logic control of the SDK states that as devices are recognized and processed, it may pool or combine it with other processed devices onto as few channels as possible, leaving open channels or frequencies we can use for the ping. Some channels, or frequency blocks, may be removed from the digital system operation pool so that the system may have open frequency to operate the telemetry system. As explained in this patent document, this may be done in the ethernet switch GUI or wireless LAN controller GUI of the digital system.

The digital and telemetry system server 214 may have SDKs that obtains information from the telemetry system, the digital system, and the camera system to track a single device. It can integrate the pertinent data onto the storage file saved under the system marker. This may show the MAC Address, offline website data, today's location or tracking information, the past location or tracking information if available, and any other pertinent information.

The server system can be configured to determine directional information for the mobile devices. When the digital and telemetry system server 214 recognizes the telemetry system and the digital system have a match, it may begin tracking a user's mobile device and storing all the data on the system marker for the session. The system recognizes that it has a match when it begins to constantly follow the mobile device with the telemetry system, achieve a soft handshake to get the MAC Address, offline website data, and digital system location, such as location information derived from the mobile device RSSI. The telemetry system may input location data. The user's system marker information may be stored under her MAC address and available for future use.

The digital and telemetry system server 214 may constantly monitor, through SDK, the digital system for new devices recognized by the wireless device tracking system. When the digital system achieves a soft handshake with a wireless device, the digital and telemetry system server 214 begins a session and stimulates the rest of the systems, such as the camera system, and the server system, to enter into action. The MAC address, IDFA, and digital or web or browser identifying information received during the soft handshake process are entered into the digital and telemetry system server 214. The digital and telemetry system server 214 may search its hard drive for a folder or file containing information on this MAC address or user information. If one does not exist, the digital and telemetry system server 214 creates a folder or file for this MAC address or user information or system marker identification (ID). Once the folder exists, a new and active system marker file is created by the system to collect all of the pertinent information for this session. If a folder already exists, the system then moves to creating an active system marker file for this session. The active system marker file may be kept open for the entire time the mobile device with the MAC address remains inside the network.

The digital and telemetry system server 214 saves into the system marker of a mobile device the pertinent data that the platform generates from some or all its sub-systems. For example, the digital and telemetry system servers 214 stores in the system marker the mobile device identifying data such as MAC address, digital or web or browser offline website data, and/or date or time stamp of entrance (session start) and exit (session end) of the system network or footprint. In another example, the digital and telemetry system server 214 stores in the system marker digital network related information for the mobile device such as date or time stamp of entrance or exit of network, device RSSI levels, Access Point (AP) communication or location information, MAC address, IDFA, web or browser or digital offline website data, and time inside the security system's network. The digital and telemetry system server 214 may also save telemetry system related information for the mobile devices in the network footprint. The telemetry system information may include verified location information collected by the security system for the entire time the mobile device was being tracked.

The server system may include a log of all activity regarding a device MAC address, IDFA, and its file creation or processing; a log of any outside connections utilizing the collected data (e.g., data companies, security, commerce, etc.) in real time or in batch data allocations, and/or a log of the logic controller completing all system tasks.

A session may end when all three of the tracking systems, such as the telemetry system, the digital system, and the camera system, can no longer communicate or locate a mobile device. However, if any of the three systems can determine a location of the mobile device then the system marker can remain open and the information is collected to be stored on the system marker. When all three systems lose contact with the mobile device, the session may end. When the digital system achieves a soft handshake with another mobile device, the process of tracking and gathering of information starts over again.

(b) Identification Server

An identification server 224 can analyze the information downloaded by the digital and telemetry system server 214 to determine whether any of the mobile devices or group of mobile devices is suspicious. As shown in FIG. 2, the identification server 224 is connected to the network 228 and can communicate with the other servers in FIG. 2. The identification server 224 can receive MAC address, location information, and other device information from the digital and telemetry system server 214. The identification server 224 begins a process to vet the MAC address or to identify targets by communicating with the integration server 226 using an application programming interface (API).

Figure 5:
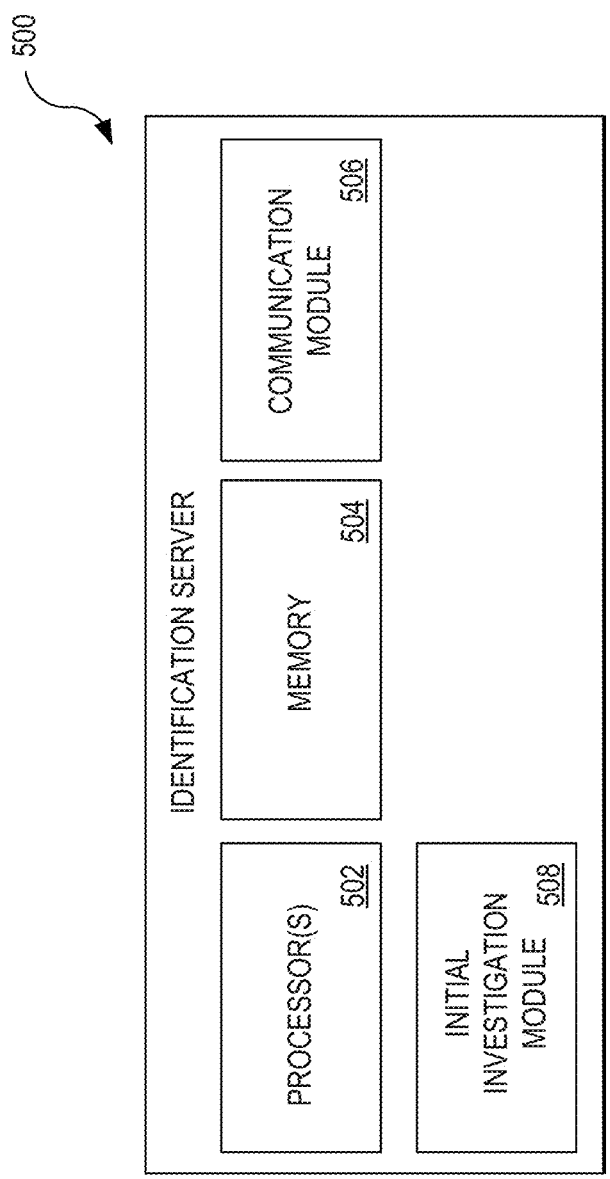
FIG. 5 shows an exemplary block diagram of an identification server.

As shown in FIG. 5, the identification server 500 includes at least one processor 502 and a memory 504 having instructions stored thereupon, where the instructions upon execution by the at least one processor 502, configure the identification server 500 to perform one or more operations. The identification server 500 also includes a communication module 506 that facilitates communication (e.g., in the form of data) with servers and devices shown in FIG. 2, via wired communication methods such as Ethernet, or wireless communication such as Wi-Fi. The communication module 506 may include one or more network interface cards (NICs).

The identification server 500 also includes the initial investigation module 508 that processes the information about the MAC addresses received from the digital and telemetry system server. For instance, the initial investigation module 508 searches for a disposable mobile device's MAC address and can flag users carrying such disposable phones as a potential target. A disposable mobile device may be flagged by the initial investigation module 508 sending a message to a security computer to be displayed to a security personnel. A disposable mobile device, also known as a burner phone, can be a relatively inexpensive prepaid cellphone with a relatively short life span. The initial investigation module 508 can processes an identification information, such as a MAC address to extract the hardware and/or network card manufacturer. Information about the network card and/or the hardware within a device can provide information about the type or model of the mobile device. The exemplary security system can also send the obtained MAC addresses to third party databases to obtain information about the kind of device associated with the MAC addresses. Disposable mobile devices such as burner phones have a unique network cards due to their unique operating system. The initial investigation module 508 can identify disposable mobile devices by determining whether the network card associated with the mobile device is identified as one that is "pre-paid" or "by the minute," or whether the network card associated with the mobile device has attributes such as "pre-paid" or "by the minute." The initial investigation module 508 can retrieve the device model name from the MAC manufacturer information. Next, the initial investigation module 508 can compares the retrieved device model name against a list of pre-paid devices stored on a database associated with the identification server 500.

The initial investigation module 508 can determine whether a MAC address has been previously processed. If the initial investigation module 508 determines that the MAC address is previously processed, then the initial investigation module 508 can retrieve information associated with the MAC address. If the initial investigation module 508 determines that the MAC address has not been processed before the new MAC address is processed as described in this patent document. The MAC address can be analyzed to determine information about the device or network card manufacturer. Additionally, the MAC address can be cross referenced with historical data of the venue and the entire security system footprint to look for issues or problems associated with that device or person.

The initial investigation module 508 can also search for MAC address assimilations, such as when one person is carrying on himself or herself multiple devices with different MAC addresses. For example, when one person carries in his or her pocket or purse a regular mobile phone and a disposable mobile phone, the initial investigation module 508 may flag such a person or vehicle as suspicious. A suspicious person may be flagged by the initial investigation module 508 sending a message to a security computer to be displayed to a security personnel. In another example, MAC address assimilation may include determining whether multiple MAC addresses or people are moving together at or near a venue. For example, the initial investigation module can determine whether devices are moving in a similar pattern, such as traveling at the same speed, making the same turns, or passing the same checkpoint. If the initial investigation module 508 determines that devices are moving in a similar pattern at multiple instances in time (e.g., at three separate instances in time), then the initial investigation module can determine that the devices are inside the same vehicle or traveling together. As described below, the MAC addresses obtained by the wireless device tracking system can be associated with pictures or video images of the persons carrying the wireless devices obtained from the camera system 212.

FIG. 2 shows the camera system 212 and its associated server 213 that can monitor persons carrying wireless devices until one or more cameras lose sight of such persons. In the event that the camera system 212 loses sight of the persons, the wireless device tracking system can be used to search for and follow the persons with the wireless devices based in part on the MAC address and the last known location obtained from the camera system. For example, the camera system server 213 controlling the camera system 212 can notify the master server 232 that the camera system 212 has lost the target. Subsequently, the master server 232 can notify the digital and telemetry system server 214 that the digital and telemetry system needs to begin pinging that MAC address for location information again. The camera system server 213 and the camera system 212 may be connected to each other and may be connected to other systems/servers of the security system of FIG. 2 via the network 228.

In FIG. 5, the initial investigation module 508 can store in a database historical data about the venue and the issues or problems that have occurred over time. This may include lists of MAC addresses that were located at or close to any recorded security incidences at the venue, lists of any venue specific targets, such as blacklists, or any other security enhancing protocol the venue may use. As an example, the initial investigation module 508 can prepare a timeline of events to show MAC addresses or video or images related to persons involved with various security incidences managed by the security personnel. Such security incidence may include disturbances, burglaries, fights, or ejected people. An example of other security enhancing protocol includes suspicious behavior and historical data about a person or device or the information of the devices traveling with one or more persons can be pooled together and annotated for future use, preventative measures, or future investigative efforts.

The initial investigation module 508 can use the timeline of events to look back in time and show information about the persons close to a security incidence at or near the venue. For example, the initial investigation module 508 can show the MAC addresses in or around the security incidence area or video or images associated with the various security incidences. The data such as MAC addresses in or around the area of security incidence, or pictures or videos associated with the security incidence can be entered into the system's potential target list allowing the security personnel to be notified any of these people are approaching the facility. The security personnel can be notified of the prior security incidence that put the persons carrying the wireless devices on the potential target list. Thus, MAC addresses that were around any historical events can be identified or vetted as potential targets.

Historical data can be collected, and certain custom site-specific patterns or procedures can be recognized and implemented at the target list server 230 (shown in FIG. 2). As an example, the target list server 230 can analyze and identify the groups of people together near a security incident, previous problem causers, or probable problem causers due to historical stored evidence, and can utilize the weather at the venue to maximize thermal image intelligence (e.g., searching for weapons and utilizing extreme temperature to highlight that ability). In some embodiments, previous problem causers can be identified by the historical data in the target list server 230. Probable problem causers can be classified by security personnel. Temperature changes can highlight the heat dissipation differences between the human body and devices or weapons. Thus, information about whether the weather is hot or cold can be processed by the identification server 224 to process thermal imaging information.

The identification server 224 can also host the API and SDK plug-ins from personal computers, systems, and servers. The identification server 224 can take directions from a master server 232 at the network operations center (NOC).

(c) Integration Server

As shown in FIG. 2, the integration server 226 is connected to the network 228 and can communicate with the other servers in FIG. 2. For example, the integration server 226 can communicate with the identification server 224 via API or SDK to receive queries, instructions, or messages (e.g., regarding a suspicious person or a disposable mobile phone) from the identification server 224.

Figure 6:
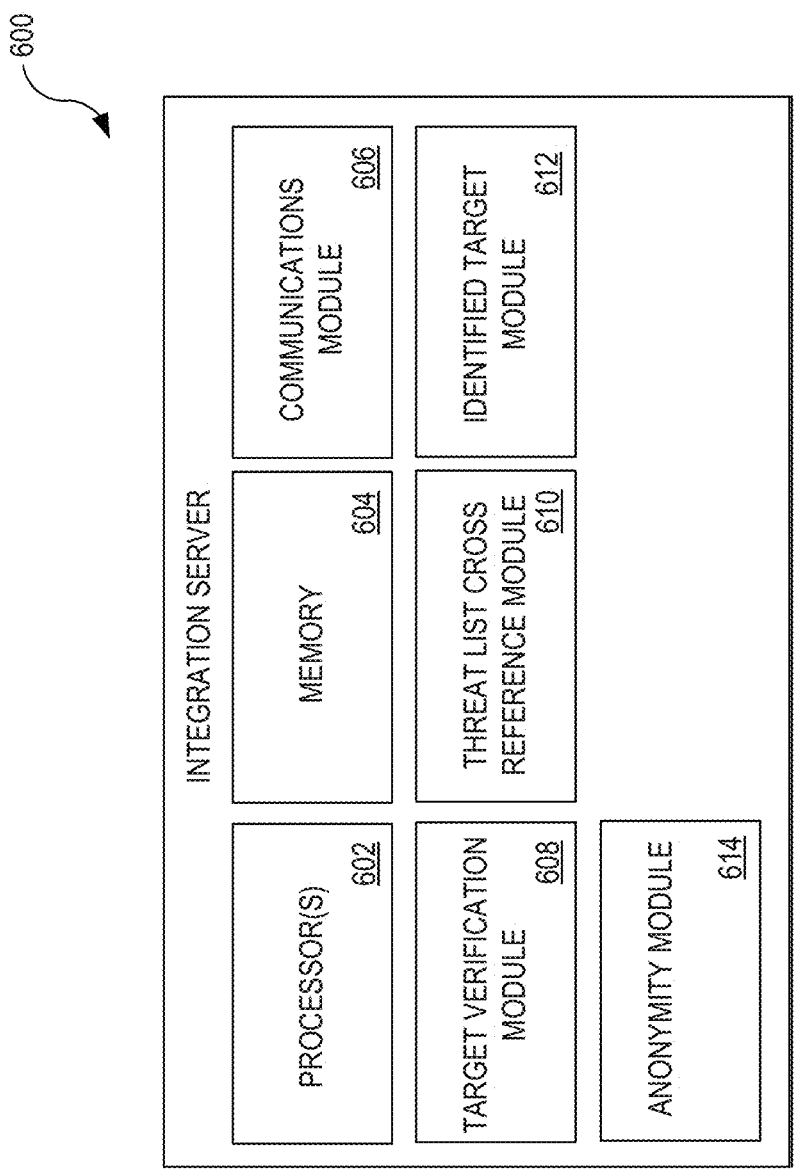
FIG. 6 shows an exemplary block diagram of an integration server.

FIG. 6 shows an exemplary block diagram of the integration server 600. As further described in the various sections below, the Integration server 600 handles the integration or process of modules such as (a) target verification module 608, (b) target list cross reference module 610, (c) identified target module 612, and (d) anonymity module 614.

FIG. 6 shows that the integration server 600 includes at least one processor 602 and a memory 604 having instructions stored thereupon, where the instructions upon execution by the at least one processor 602, configure the integration server 600 to perform several operations. The integration server 600 also includes a communication module 606 that facilitates communication (e.g., in the form of data) with servers and devices shown in FIG. 2, via wired communication methods such as Ethernet, or wireless communication such as Wi-Fi. The communication module 606 may include one or more network interface cards (NICs). The integration server 600 also communicates with and obtains information from the Camera System that is further described in Section III below.

(i) Target Verification Module

FIG. 6 shows a target verification module 608 that can cross-reference or compare the location information of the digital and telemetry system server and the location information of the camera system (described below) to identify whether the camera system and the telemetry system and/or digital system are tracking the same targets. As discussed above, the digital and telemetry system server identifies the MAC address and/or location of mobile devices within the wireless footprint of the security system. The camera system (described below) can identify the location of one or more persons or vehicles within the one or more camera's field of view. The target verification module 608 can cross reference the location information from the digital and telemetry system server with the location information obtained from camera system at a pre-determined interval in time (e.g., approximately every three seconds). When the target verification module 608 determines that both the wireless device tracking system and camera system are tracking a target or person located in or moving in the same or similar space at the same time at multiple instances in time (e.g., at three separate instances in time), then the target verification module 608 determines that the same target or person is being tracked by both systems. In one example implementation, the target verification module 608 can determine whether the wireless device tracking system and the camera system are tracking the same individual by comparing the location information associated with that individual derived from both the wireless device tracking system and the camera system. For instance, the target verification module 608 can determine that the same individual is being tracked by both systems by compare the location values from the wireless device tracking system and the camera system to determine that both locations are the same or within a pre-determined value of each other.

In some embodiments, once the target verification module 608 determines that a same person is being tracked by both the wireless device tracking system and the camera system, the target verification module 608 can exclusively use the camera system (i.e., without the wireless device tracking system) to track or record the location of that target throughout the footprint, as further explained in sections below related to the camera system and the identified target module 612. The recorded location of the person may be stored in a system marker file. If a person or vehicle carrying the mobile device moves out of the field of view of the camera system, then the target verification module 608 may instruct the digital and telemetry system server 214 to continue to track the person via the wireless device tracking system using the person's wireless device.

(ii) Threat List Cross Reference Module

The target server can store a list of potential targets that can include a list of MAC addresses, IDFA numbers, surveillance intelligence, descriptions, or mug shots. As further described in the camera system sections below, the facial recognition software can process the mug shots or facial information about a potential target. The facial recognition software can analyze the features of the mug shot and compare the facial features of the targets on the mug list against the facial features of the people visiting the venue. When the facial recognition software identifies a potential person at the venue as a person on the mug list, the threat list cross reference module 610 can notify the onsite security personnel who can properly respond.

The threat list cross reference module 610 identifies any potential threats to the protected facility by obtaining information, such as facial features of a person or an identifier associated with a device or vehicle within the footprint and compares that information with lists of known threats. The list of known threats, such as facial features of individuals (e.g., mug shots), device identifiers, or vehicle identifiers, may be obtained from local, state, or federal wanted lists, watch lists, or list of blacklisted individuals. The list of known threat can include national or international terrorist watch lists. The lists can be stored in the target list server. The threat list cross reference module 610 can associate multiple devices to a single person and it can associate multiple people to a single group.

The threat list cross reference module 610 can provide anonymity and/or database security by using encrypted API and by relying on operations associated with the anonymity module 614 as explained in the section below.

(iii) Identified Target Module

The identified target module 612 tracks, follows, records, autonomously investigates, and/or informs local security officials of an identified target. As further explained in the camera system section below, the identified target module 612, via the camera system API, tags the identified target (person or vehicle) as a primary target. The primary target data (e.g., determined location and/or obtained image of persons) is exported to the identified target module 612 for investigation and distribution. For the primary target data, the identified target module 612 can use a system marker file to record all movement of the target within the footprint using the camera system. The identified target module 612 can pan or zoom the various cameras to achieve this goal. The identified target module 612 can use high-definition camera technology to capture clear images of the target. The identified target module 612 can also use night vision to obtain images of targets in the dark or at night.

As further described in the camera system section, the identified target module 612 can receive information that a person is carrying a weapon. As further described in the camera system section, the identified target module 612 can also receive from the facial recognition module of the camera system a visual profile of the target. The target information is shared with the onsite security command center or officer. If the target gets within a certain distance of an entrance, for example within 50 feet of an entrance, the identified target module 612 sends a photo of the target to any one or more security personnel at the entrance where the target attempts to enter a venue. In another example, if a person carrying a device that has a MAC address previously known to be suspicious, the identified target module 612 can send a message to one or more security personnel, where the message may include a picture of the person matched with the location of the mobile device as explained in this patent document. The primary target can be tracked by the onsite security personnel.

(iv) Anonymity Module

The anonymity module 614 tracks, follows, records, autonomously investigates, and/or informs local security officials of an identified target without singling out the target (also known as anonymous vetting). The anonymity module 614, via the camera system API, tags the original identified target such as a person or vehicle as a primary target, and a certain number of other persons randomly chosen by the anonymity module 614.

For example, if a person is identified as being associated with a MAC address located close to a robbery incident, then the anonymity module 614 may manage such an association with a low confidence. In other words, simply because a person is close to a robbery incident does not necessarily mean that that person was involved with the robbery. Continuing with the example, the anonymity module 614 may consider the person located close to the robbery incident as a soft target. In some embodiments, the anonymity module 614 may prompt via a user interface a certain number of other targets to identify as the primary target. If a security personnel chooses, for example, a number of targets to be four, then the anonymity module 614 sends all the information associated with the person close to the robbery incident along with the information associated with multiple people (e.g., three or four other people) randomly chosen by the anonymity module 614.

As another example, if a person is identified using facial recognition, as described in the sections below, as belonging to the FBI's list of potential targets or persons of interest, then the anonymity module 614 can follow a pre-programmed instruction from the FBI to follow and record but not to directly confront or harass the person. Thus, the anonymity module 614 can employ extra screening. The third protective zone of the security system may include onsite security personnel that may thoroughly physically screen the person and the anonymity module 614 can randomly choose a certain number of other random targets the system is tracking that are within the same area as the person who is on the FBI list. For example, if a target is sensitive to the FBI and the FBI wants the target screened but not alerted that anything is wrong, the system may perform anonymity operations, as described above, by choosing a certain number of other targets before sending the information to the security personnel. This maintains target anonymity and list integrity.

The anonymity module 614 may send all of the information associated with the person wanted by the FBI and the other persons randomly chosen to the appropriate security personnel, via a communication interface or a graphical interface to law enforcement or to on-site security personnel.

The primary target data (e.g., determined location and/or obtained image of persons) is exported to the anonymity module 614 for investigation and distribution of all targets, such as the primary target plus a certain number of other randomly chosen individuals. All targets are vetted as potential targets to allow for target anonymity.

(d) Target List Server

As shown in FIG. 2, the target list server 230 is connected to the network 228 and can communicate with the other servers in FIG. 2. The target list server 230 can allow for secure or encrypted data transfer from and/or to a server controlled by law enforcement. For example, an encrypted portal can be opened for each event so that the most updated or most appropriate list of known threats (described above) can be received by the target list server 230. One benefit of using an encrypted portal to download the list is that it may be a better solution for some parties with large list of known threats. The encrypted portal for each event and the subsequent list of suspects for security operation can be event specific. The list of suspects can be temporary and disposable. The portal can be opened moments before the event, used for the updated list information and system operation during the event, and then closed and deleted after the event for security purposes. In some other embodiments, various watch list can be held on client side on the target list server 230. The watch list can include, for example, local, state, federal, national, international, venue specific, and/or company specific lists.

The target list server 230 hosts interface with servers associated with other security systems. For instance, an interface on the target list server 230 allows for the same target to be recognized in the other security systems located in other venues and trigger communications sharing. When the same target is recognized, the last system marker file is shared, via the Internet, from a first security system's server to a second security system's server, such as from one venues computer network to another venues computer network (e.g., master servers and integration servers). This can allow for system markers to be comprehensively updated with the targets entire movement through the network.

Target lists can be setup to allow for complete anonymity of the names or identities of persons identified on a list. The target lists can be located on an appropriate server depending on the measured sensitivity of the intelligence leading to the target ID. For example, the target list may be located on a server controlled by law enforcement officials. In embodiments where the target lists are hosted by servers controlled by law enforcement, the server system provides a feed, via SDK, to the law enforcement's servers that stores the target lists. The servers controlled by the law enforcement notify the exemplary security system of any hits, such as when an image of a person obtained by the camera system matches a facial profile of a person on the target list.

(e) Master Server

As shown in FIG. 2, the master server 232 is connected to the network 228 and can communicate with the other servers in FIG. 2. The master server 232 can control and archive all actions of the servers or computers inside its footprint, such as the servers shown in FIG. 2. The various local servers (e.g., slave severs) can report back to the master server for the pertaining market. Files (e.g., system marker or log files) may be backed up from local servers to master server.

III. Camera System

In FIG. 2, the camera system 212 tracks targets within the field of view of one or more cameras that are located or placed at various known locations in and around a venue or a premise. The one or more cameras can obtain images, still images or video images, to provide images of a person or a vehicle to identify the person or vehicle, and, in addition, relying on the locations associated with the images, to also locate the person or vehicle. The camera system can employ one or more cameras and can utilize facial recognition, high-definition, infrared, pan, zoom, and/or location-awareness technologies to track the environment inside or surrounding a venue. The integration server 226 may be integrated, using an SDK, with a camera system 212. The output of one or more cameras, via API, can be stored in the integration server 226. As a result, as explained above, the integration server 226 can cross reference the real-time location information of the digital and telemetry systems, for the MAC addresses inside the wireless footprint, with the location information of the targets the camera system is tracking. Thus, a location of a mobile device can be associated with a picture of the person or vehicle carrying the mobile device. The camera system 212 can perform certain operations such as tracking the targets after the target verification module 608 performs its operations, as discussed in the section above. The one or more cameras includes wireless or wired communications technologies, such as Wi-Fi or ethernet to communicate with a camera system server 213.

The camera system 212 can be used to survey the area surrounding or inside the venue where the camera system 212 may be located. As a result, the camera system 212 can be used to survey the individual location topography and layout of an area. The camera system can be integrated with range, distance, or location information. For example, the camera system server may use the still or video image from the one or more cameras to determine distance or location information of a person or vehicle carrying one or more mobile devices, where the person or vehicle is within the field of view of the one or more cameras. As discussed in FIG. 7, the camera system server 700 includes target tracking module 708. A moving object that enters the one or more cameras' field of vision can be given a target identifier (ID) that can be generated by the target tracking module 708. The assigned target ID could change if, after the camera system cross references its historical data, the system recognizes the moving object as a person that has appeared before the camera system.

The camera system can be integrated with license plate and vehicle or facial recognition software. If the camera system recognizes that a person appeared before the camera system, and if the camera system makes a positive identification, then the previous data, name, or target ID is associated with the moving object or target. The target tracking module 708 (shown in FIG. 7) can constantly scan the cameras' field of vision for a new target. A new target can be any moving object within a camera's field of vision that the target tracking module 708 has not flagged or marked or processed before. Once a new target is recognized by the target tracking module 708, the target tracking module 708 attempts to identify the type of target, such as a pedestrian, vehicle, or a train. As an example, if the target tracking module 708 determines that the target is a pedestrian (i.e., a person), then the target tracking module 708 begin sharing data with the facial recognition module 714. The facial recognition module 714 captures the facial pictures of the new pedestrian and then cross-references with historical data and the available database of targets that can be located on a memory or a hard drive. When the facial recognition module 714 matches the facial signature of a pedestrian that has been processed by the system before, or the pedestrian is on one of the available target lists, the available information about that pedestrian, including the historical data or target data, can be shared with a security personnel.

As another example, if the target tracking module 708 determines that the target is a vehicle, then the system can perform the same processing steps as disclosed in the paragraph above, except that the target tracking module 708 can classify the target as a vehicle and the license plate recognition module 716 can start analyzing license plate information obtained by the target tracking module 708. For example, a large truck or van or a rental vehicle can be processed as potential targets by the target tracking module 714 due to a higher probability that those vehicles may be involved with suspicious activity. As disclosed in this patent document, the facial recognition module 714 can determine whether it can identify the driver.

In FIG. 2, the camera system server 213 can store the historical data of the camera system. If the facial recognition module determines that a person or vehicle has been identified before (e.g., by comparing the image received from the camera system 212 with images previously stored in the integration server 226), the camera system server 213 can search for potential MAC address information related to the previous identification of the person or vehicle. As a person or vehicle is tracked by the digital and telemetry system server 214 to identify a physical location, the integration server 226 and the identification server 224 can determine whether the MAC address or a particular person has been previously processed to bring the appropriate data into the integration server 226 for processing.

Figure 7:
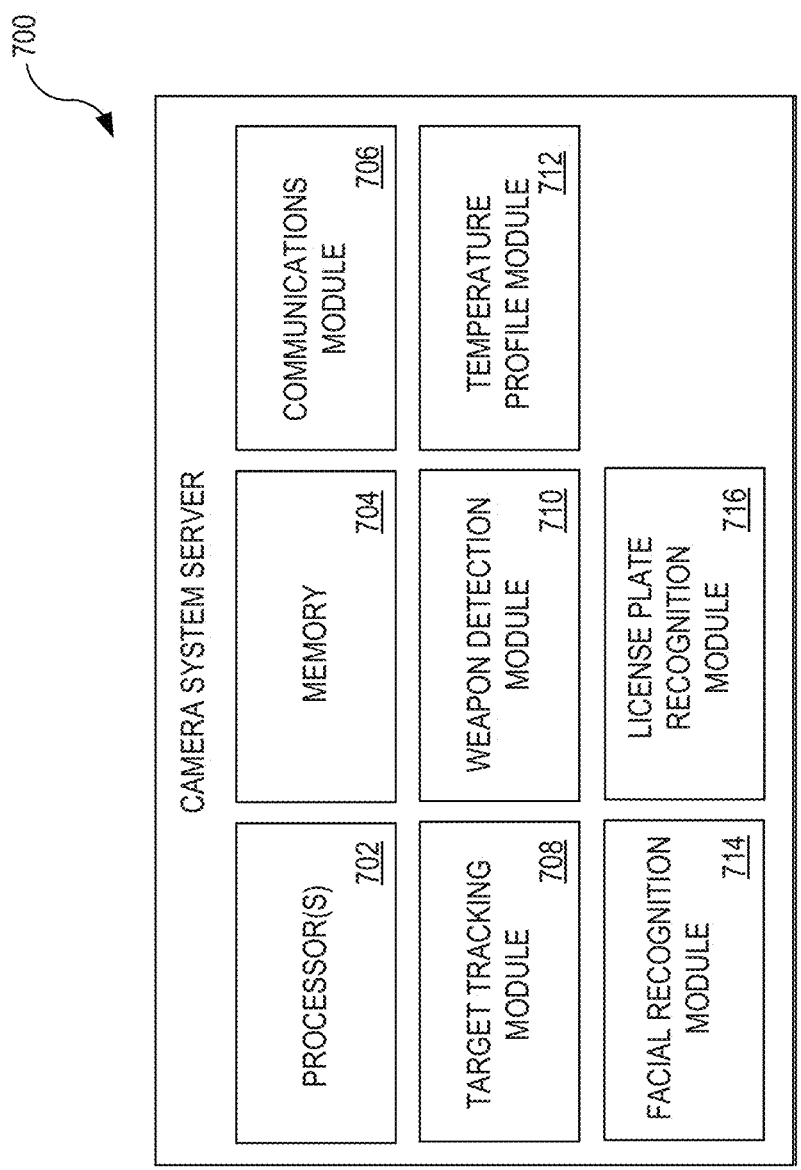
FIG. 7 shows an exemplary block diagram of a server controlling the various features of the camera system.

In FIG. 7, the output of the target tracking module 708 can include the latitude and longitude associated with an object that is moving or stationary within the camera's field of vision. As further explained below, the latitude and longitude information from the target tracking module 708 can be cross referenced with the wireless device tracking system's location information (e.g., latitude and longitude). The security system can allow the wireless device tracking system to hand off tracking a person to the camera system's target tracking module 708 once the security system determines that the same person is being tracked by the wireless device tracking system and the camera system (e.g., by comparing the location information). In some embodiments, once the target tracking module 708 determines that a same person is being tracked by the wireless device tracking module and the camera system, the target tracking module 708 can instruct the digital and telemetry system server to stop processing the first and second reflected signals received from the mobile device associated with the person.

The camera system 212 can be integrated, via SDK, with the integration server 226. This allows for the information from the camera system 212 to be incorporated with the information from the digital and telemetry system.

As the security system processes and matches information obtained from the digital system, telemetry system, and camera system, the combined information can be added to the system marker for this session. This is known as "triple processing" a target. As the system has triple processed a target so that the telemetry system, the digital system, and the camera system match on the same target (e.g., determine that a person is in a same or similar location), the integration server 226 can then prioritize the camera system feed and ability to track the target over the digital and telemetry systems and combines that system marker with the camera system marker. In other words, the camera system marker, which is the output of the camera system, becomes the primary tracking mechanism of the exemplary security system until the camera system loses sight of the target. As explained in the section related to the integration server, if a person or vehicle carrying the mobile device moves out of the field of view of the camera system, then the security system may continue to track the person via the wireless device tracking system using the person's wireless device.

In some embodiments, triple verification of location data and transfer of pertinent data through the network is possible as a target travels from one security system to another security system. If a same camera system marker is recognized by a security system's camera system at another venue so that the same marker (e.g., license plate, vehicle, pedestrian, etc.) is recognized by another system, such a system can quickly re-open the latest system marker file and update the system marker.

The camera system's object tracking, weapon detection, and facial recognition features are further described below.

FIG. 7 shows an exemplary block diagram of a camera system server 700 controlling the various features of the camera system. The camera system server 700 includes at least one processor 702 and a memory 704 having instructions stored thereupon, where the instructions upon execution by the at least one processor 702, configure the camera system server 700 to perform several operations. The camera system server 700 also includes a communication module 706 that facilitates communication (e.g., in the form of data) with servers and devices shown in FIG. 2, via wired communication methods such as Ethernet, or wireless communication such as Wi-Fi. The camera system server 700 can communicate with the one or more cameras using wireless or wired communications. The communication module 706 may include one or more network interface cards (NICs). The camera system server 700 also communicates with and obtains information from the camera system as described in this patent document.

(a) Object Tracking and Weapon Detection

As described in this patent document, the wireless device tracking system allows the security system to locate and track mobile devices using, for example, their MAC address, IDFA information and/or offline website data. The wireless device tracking system may also provide latitude and longitude information of the various mobile devices that can be tracked. The latitude and longitude information along with the MAC Address, IDFA information, and/or offline website data can be sent to a logic controller inside the digital and telemetry system server to prioritize such information.

The camera system server 700 platform of the camera system can include a target tracking module 708 described above in this patent document. As an example, a target tracking module 708 can include a person tracking software that can be provided by Dynapel Systems, LLC. The target tracking module 708 can provide the camera system with the ability to autonomously track moving objects within the one or more cameras' field of vision. As a moving object is recognized by the target tracking module 708, the target tracking module 708 can generate a target marker ID which may be a file similar to the system marker file. This target marker ID may change after the identification server 224 and camera system server 213 associated with the camera system 212 processes the information against historical data. If the servers 213 and 224 have has processed this target before and camera system server 213 recognizes the target, for example, through facial recognition or license plate recognition, then the marker changes to the previously processed ID information. This target marker ID may include the latitude and longitude information of the target marker ID as the person or vehicle moves though the field of vision of the camera system.

The camera system is laid out with recognized choke points within the venue patron flow patterns or vehicle traffic flow patterns and within the camera system viewpoints. The components of the wireless device tracking system are located around a venue to maximize the wireless range in or around the patron or vehicle traffic flow pattern choke points. In some embodiments, especially in recognized choke points, the security system can obtain and match latitude and longitude information from both the wireless device tracking system and the camera system at multiple instances in time (e.g., at three separate instances in time).

Once this match is completed, as explained in this patent document, the logic controller begins to record the movement of the person or vehicle under the camera system marker ID file, which can now be marked as primary, until the camera system loses contact with the target.

The camera system server 700 includes a weapon detection module 710 that can utilize thermal imaging to help determine if a pedestrian within the camera system's field of vision is carrying any weapons. In some embodiments, at least some of the cameras in the camera system include a thermal camera with thermal imaging capabilities. Due to the heat exchange characteristic differences between metal, plastic, and the human body or clothing, weapons can be recognized by the weapon detection module 710 or security personnel manning the camera system server 700. As the thermal cameras scan the field of vision they are integrated with the marker ID information and are tracking targets accordingly. Their scans assist in low light environments, and smoke or fog environments.

Additionally, the camera system server 700 includes a temperature profile module 712 that utilizes color saturation processing to look for anomalies that should be further assessed by a human asset. For example, as each target walks towards the camera system, the temperature profile module 712 analyzes the subject via the thermal imaging colorization output and the symmetry of the target. The temperature profile module 712 may analyze, for example, the front belt area or the back-belt area, the left armpit area or the right armpit area, or the left leg or the right leg. The colorization profile between the left arm area and the right arm area should be somewhat uniform. A color or temperature anomaly in those areas, or others, could mean a weapon is present. If a color anomaly is noticed by the temperature profile module 712, then the temperature profile module 712 shares the target information with onsite human asset for further assessment or appropriate action. The thermal camera's video feed can be processed by a color matching SDK looking for anomalies in the color layout of a target. As an example, as each pedestrian passes through a traffic intersection or choke point the temperature profile module 712 can look for there to be matches in color or temperature at the front belt and back belt, the left armpit and the right armpit, the left ankle and the right ankle. When temperature symmetry is not present, the temperature profile module 712 can identify a person as suspicious to allow security personnel to review that person. The temperature profile module 712 can scans and shares that scanned data with the weapon detection module 710 to perform its scans.

(b) Facial Recognition

The camera system server 700 may include a facial recognition module 714. The facial recognition module 714 may be a third-party target identification or facial recognition software installed onto the camera system server 700. As an example, the third party facial recognition software may be provided by IntelliVision. Some benefits of the facial recognition module 714 include better utilization of potential target lists, better target tracking, better target identification, and better target data logging. As the facial recognition module 714 logs a target as a pedestrian, the facial recognition module 714 adds facial profile to the camera system marker ID. Therefore, every time the facial recognition module 714 determines that a person has appeared before the camera, that person's collective profile can be pulled up and available real-time to the system for processing. The local or state or federal or international police authorities can provide facial recognition profiles, or pictures of wanted list to be entered into the potential target list that can be stored on the target list server 230 in FIG. 2. If the facial recognition module 714 determines that a person appearing in an image obtained from the camera matches a facial profile of an image in the potential target list, the facial recognition module 714 may provide or display this information to onsite security personnel that can choose to take appropriate action. A facial recognition module 714 logs a 'hit,' when facial recognition module 714 identifies a face of a person visiting a venue to be similar to or same as a face of a person on a mug shot list, or video feed, or picture evidence that the authorities used to upload their face-data into the target list server. Thus, the facial recognition module 714 communicates with and obtains from the target list server the mug shot or picture of suspects. Recognized targets are then cross referenced with the current status of the wireless device tracking system. If the MAC address previously associated with the facially recognized pedestrian, in the same vicinity, the identification server 224 and camera system server 213 logs that as a match and tracks the info under the camera system marker ID.

Returning to FIG. 1, the security system 100 includes a camera system 112 that can be mounted on the support structure 102. The camera system may include one camera or multiple cameras that point at different angles to obtain videos from different locations. As shown by dotted lines in FIG. 1, multiple cameras are configured to obtain video of multiple areas that includes at least some of the plurality of mobile devices 118*a*-118*d*. The cameras may capture an image of a person or persons that carry mobile devices 118*a*-118*d*. As further described in this patent document, the integration server 114 may use the captures images to perform facial recognition of the person or persons carrying mobile devices 118*a*-118*d*.

In FIG. 1, the camera system 112 is communicably coupled to the integration server 114. The integration server 114 receives, from the one or more cameras, video of the users of the plurality of mobile devices 118*a*-118*d*. The camera system may be used by the security system to obtain, process, and record video from a location. The one or more cameras in the camera system may be a high-definition camera, internet protocol based, with pan or zoom, infrared, and night-vision capabilities. The camera system may include cameras mounted on various buildings or support structures. The cameras may include fortified or solar powered cameras, panoramic cameras, fisheye or stealth camera, enhanced IP camera, enhanced dome IP camera, or mission critical camera.

The integration server 114 can control one or more cameras in the camera system 112. The integration server 114 includes a GUI interface with one or more cameras of the camera system 112 and the vehicle or facial recognition software. The integration server 114 can also communicate, using an SDK, with the telemetry and digital systems, and can operate off of a logic controller build into the system to help share information from one security system to another. The integration server 114 hosts communication with server for global system control.

When the mobile device location is obtained from the digital and telemetry systems, the security system searches the camera system for image inside the same space or time. If the security system determines that a same person is being tracked by multiple systems, as explained in this patent document, then the security system can use the camera system to perform additional security operations.

The exemplary camera system 112 are installed so they can survey as much of the wireless coverage footprint as possible for the individual location topography and layout. The camera system is integrated with facial recognition software. The camera system may assist in following the system marker in the same manner of operation as facial recognition software. The camera system may be integrated with range or distance or location information.

When the integration server 114 combines or pools information obtained from the telemetry system, digital system, and camera, the information is processed, matches may be found, and the combined data is all pooled into the system marker. When the system has triple processed a mobile device, using for example, the telemetry system, the digital system, and the camera system that all match on the same mobile device, it then flags that system marker with the camera system marker. This allows for triple verification of location data and transfer pertinent data as a device travels through the network The camera system assists the wireless access points and telemetry systems by assigning each person with a mobile device an appropriate system marker. The camera system's recognition software can be utilized to process a person as he or she moves in or near a crowded location, such as a stadium or venue or an airport. As the camera system begins to track a person the system tags the system marker with the location information. When a server determines that a location information from the camera system matches the location information from the digital and telemetry systems, as described above, then the digital and telemetry system server can be notified of the camera system's system markers in queue.

Figure 3:
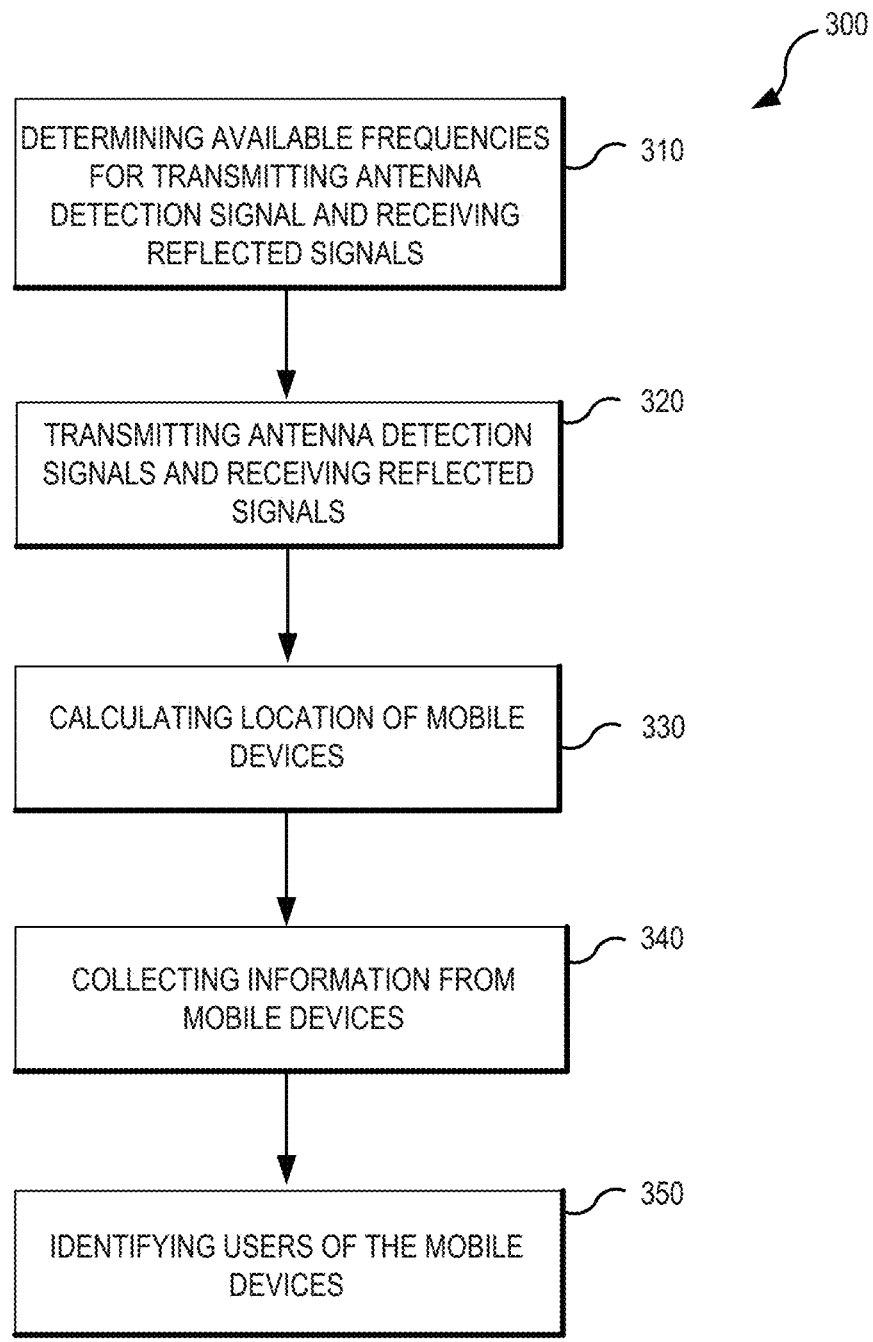
FIG. 3 illustrates an exemplary flowchart for a security system.

FIG. 3 shows an exemplary flowchart of a security system. An exemplary method 300 for tracking a person with a mobile device includes a determining operation 310 where a server may determine, using a first signal generator, a first set of available wireless frequencies to use for a first antenna and a first set of telemetry antennas. At the determining operation 310, a server may also determine, using a plurality of wireless access points, a second set of available wireless frequencies to use for a second antenna and a second set of telemetry antennas.

At the transmitting and receiving operation 320, a server may instruct the first signal generator to periodically generate a first antenna detection signal using the first set of available wireless frequencies. Next, the first antenna transmits the periodically generated first antenna detection signal. Subsequently, the first antenna and the first set of telemetry antennas receive a first set of reflected signals. The transmitting and receiving operation 320 may also include a server instructing a second signal generator to periodically generate the second antenna detection signal using the second set of available wireless frequencies. As a result, the second antenna transmits the periodically generated second antenna detection signal. Subsequently, the second antenna and the second set of telemetry antennas receive a second set of reflected signals. The first and/or second set of reflected signals can enable a server to detect one or more antennas on each of one or more mobile devices located within the wireless range of the digital and/or telemetry systems.

At the calculating operation 330, a server calculates the location of the plurality of mobile devices in response to receiving any one or more of the first set of reflected signals, or the second set of reflected signals. The calculating operation 330 may include a server determining the location of the plurality of mobile devices using the first and the second signal strength indicators measured by the first signal generator. The first signal strength indicator for the first antenna detection signal can be measured using the first signal generator at a predetermined distance from a first transmitter of the first antenna. The second signal strength indicator for each of the first set of reflected signals can be measured using the first signal generator.

In some embodiments, the calculating operation 330 may also include determining the location of the plurality of mobile devices using the first and the second signal strength indicators measured by the second signal generator. The first signal strength indicator for the second antenna detection signal is measured using the second signal generator at a predetermined distance from a second transmitter of the second antenna. The second signal strength indicator for each of the second set of reflected signals can be measured using the second signal generator.

In some embodiments, after the calculating operation 330 is performed, a server can obtain the location of the persons who appear within the cameras' field of view. The calculated location from operation 330 can be compared with the location obtained from the camera system. If a server determines, at different instances in time, that the calculated location of the mobile devices and the location of the persons from the camera system is the same or similar location, then the server may use a camera system to track the person who continues to appear in the cameras' field of view. In some embodiments, at this point, the wireless device tracking system stops tracking the person's mobile device until a server determines that that person has moved out of the cameras' field of view.

At the collecting operation 340, a server may use the plurality of wireless access points to collect MAC address and/or IDFA information from the plurality of mobile devices during soft-handshake. In some embodiments, the wireless access points may also collect offline website data from the mobile devices during the soft-handshake. In some embodiment, the exemplary method 300 may also include a combining operation after the collecting operation 340 where a server may be used to combine onto a same wireless frequency at least some of the mobile devices connected to the plurality of wireless access points. In some embodiments, a digital and telemetry system server may perform the operations 310-340.

At the identifying operation 350, a server (e.g., an integration server) may obtain images of users' faces using a camera and employ facial recognition technology to check (e.g., by comparing) image of various users against a threat list. In some embodiments, a server may detect objects such as a gun or other weapons carried by a user using one or more thermal cameras.

In some embodiments, security system can be used to identify threats located farther than the camera system's optical and signal processing limits. As vehicle, pedestrian, bicycle enters the first defensive perimeter with a mobile device the digital system of the security system may achieves a soft handshake with the device to obtain the MAC address and/or offline website data from the mobile device. The digital and telemetry systems can provide to a server the obtained MAC address and/or offline website data, and any location information obtained from the telemetry system of the wireless device tracking system. The telemetry system can track the MAC address, or multiple MAC addresses in an area. As described in this patent document, a server (e.g., an identification server) can process the MAC address using an initial investigation module.

Figure 8:
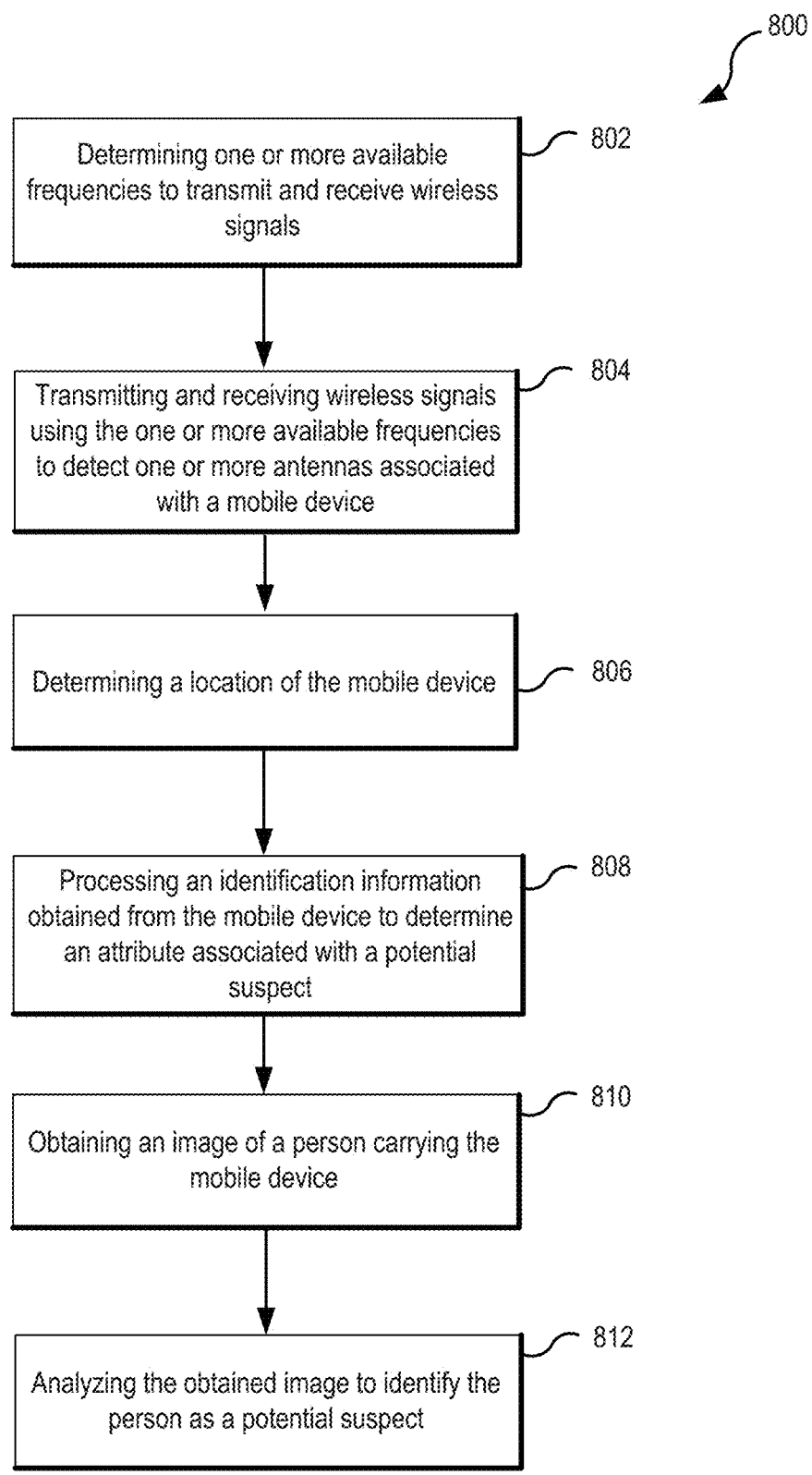
FIG. 8 shows a flowchart for tracking one or more mobile devices.

FIG. 8 shows a flowchart for tracking one or more mobile devices. At the determining operation 802, one or more available frequencies are determined for transmitting and receiving wireless signals. At the transmitting and receiving operation 804, wireless signals are transmitted and received using the one or more available frequencies to detect one or more antennas associated with a mobile device. In some embodiments, the mobile device is a Wi-Fi capable device. At the determining operation 806, a location of the mobile device is determined. In some embodiments, the location of the mobile device is determined to within three feet of actual location of the mobile device.

At the processing operation 808, an identification information obtained from the mobile device is processed to determine an attribute associated with a potential suspect. In some embodiments, the attribute associated with the potential suspect includes the mobile device identified as a disposable device. In some embodiments, the attributed associated with the potential suspect includes the type or model names/number of the mobile device, or that the mobile device is pre-paid or by the minute type device. In some embodiments, the identification information of the mobile device includes information obtained from a media access control (MAC) address of the mobile device.

At the obtaining operation 810, an image is obtained of a person carrying the mobile device. At the analyzing operation 812, the obtained image is analyzed to identify the person as a potential suspect. In some embodiments, the obtained image is analyzed by performing facial recognition on the image of the person carrying the mobile device.

In some embodiments, the flowchart of FIG. 8 also includes obtaining and analyzing a thermal image of the person to detect weapons located on the person. In some embodiments, the flowchart of FIG. 8 also includes determining that the person is carrying more than one mobile device. In some embodiments, the flowchart of FIG. 8 also includes obtaining, using one or more cameras, a location of the person that appears in a field of view of the one or more cameras; determining, at different instances, that the determined location of a mobile device is same or similar to the location of the person obtained using the one or more cameras; and tracking the person that continues to appear in the field of view of the one or more cameras.

The following description illustrates one example implementation of the technology disclosed in this patent document.

The camera system may include multiple cameras with multiple uses at each installation location. Each location may include for example, three to six cameras. Various types of cameras can be used in the security system. Fixed panoramic cameras can capture the entire environment and do not move. Information obtained from the location-aware cameras are used in the target verification module, as described in the sections above.

The cameras may be thermal cameras used to look for people in low light and can be combined with night vision cameras. Thermal cameras can be used in situations where night vision will not work as effectively, such as in a smoke or fog. Thermal Imaging is used to identify pedestrians carrying weapons. Security personnel can determine whether a person is carrying a weapon using the thermal images. Mission critical or pan zoom cameras are used to follow, track, and investigate identified targets or primary target used for MAC address or facial recognition. Cameras can be controlled or accessed by secure and encrypted Wi-Fi network which can be broadcasting from the onsite digital system. Panoramic or wide-angle location-aware antennas can be pointed at each and every traffic choke point the security perimeter design has identified. For the duration of the time that the MAC address is inside the security system's perimeter, the wireless device tracking system may log the wireless device's location in real-time at a pre-determined interval in time (e.g., every three seconds). The camera system can be controlled by onsite computer/server and can include facial or license plate recognition software and target or multiple targets tracking software. The camera system software includes the location-aware abilities of the camera and the controls to manually pan zoom. The target or facial recognition software leverages that location information when tracking or looking for its targets.

Both the telemetry system location information and the camera system target location system information are sent to a server (e.g., integration server) to perform operations associated with the target verification module. In real-time, the target verification module can monitor and share the location data from the telemetry system and the location for the cameras system. The target verification module can be used to compare the two location information and determines a match, such as when the two location information are the same or similar. If the target verification module determines a location match, especially at a choke point, on multiple independent scans (e.g., three times) by the wireless device tracking system and the camera system every pre-determined interval in time (e.g., every three seconds), then the system marks them as a match and begins recording or saving all data under the system marker associated with the MAC address for system usage.

The camera system can notify the computer/server, that the MAC address is being tracked with the installed hardware or software of the cameras system. As each and every MAC address is lost by the camera system, the computer/server is notified, and the wireless device tracking system removes it from its match list and it begins scanning or recording info about the MAC. In some embodiments, the camera system can be used to passively follow every target.

The wireless device tracking system can also track every MAC address. The location information obtained from the wireless device tracking system and the camera system can be matched with each other. Next, the data streams associated with the camera system and the MAC address processing can be tied together. The security system can also perform active target identification, target tracking, and target apprehension before the target can commit a crime or attack. The venue and local, state, federal, international security, law enforcement agencies can provide a list, or a secure API to a server containing a list, of potential or wanted targets. These lists can contain known MAC addresses, faces or mug shots, or descriptions that pose a threat. These lists or APIs can be stored on the target list server and can be processed by the threat list cross reference module.

The wireless device tracking system can be provided to or are received by the API for MAC address cross-referencing. The mug shots or descriptions are provided to or are received by the API for the facial recognition or description cross-referencing. For example, MAC address from watch lists, and face-data from wanted or watch lists can be stored in the target list server, or can be stored in the law-enforcement owned or operated server and accessed via API, and then cross-referenced for target acquisition. If either system has a match, for example, a MAC address match, a facial recognition match, or a license plate match, then the system begins the MAC address or facial recognition process. As part of the MAC address or facial recognition process, the system tracks the target autonomously utilizing the target tracking module of the camera system server. The output of this system is shared with onsite security personnel or assets. These assets are provided with images or video of the target, and any other information gleaned from the target during the previous systems within the security system. Onsite security or local, state, federal or international security assets deal with the target appropriately. Should any local, state, federal or international service want to keep the identities of these targets a secret, they can choose to operate with the identified target masking or anonymity module of the integration server. All data can be stored in the security system's server and is shared with any systems the venue client wishes. Historic data can be used for training, investigations, traffic flow studies, commerce studies, etc., MAC address assimilation, camera system abilities, thermal imaging, etc., may also be available to investigate historical events.

The following four scenarios illustrate example implementations of the technology disclosed in this patent document.

Figure 9A:
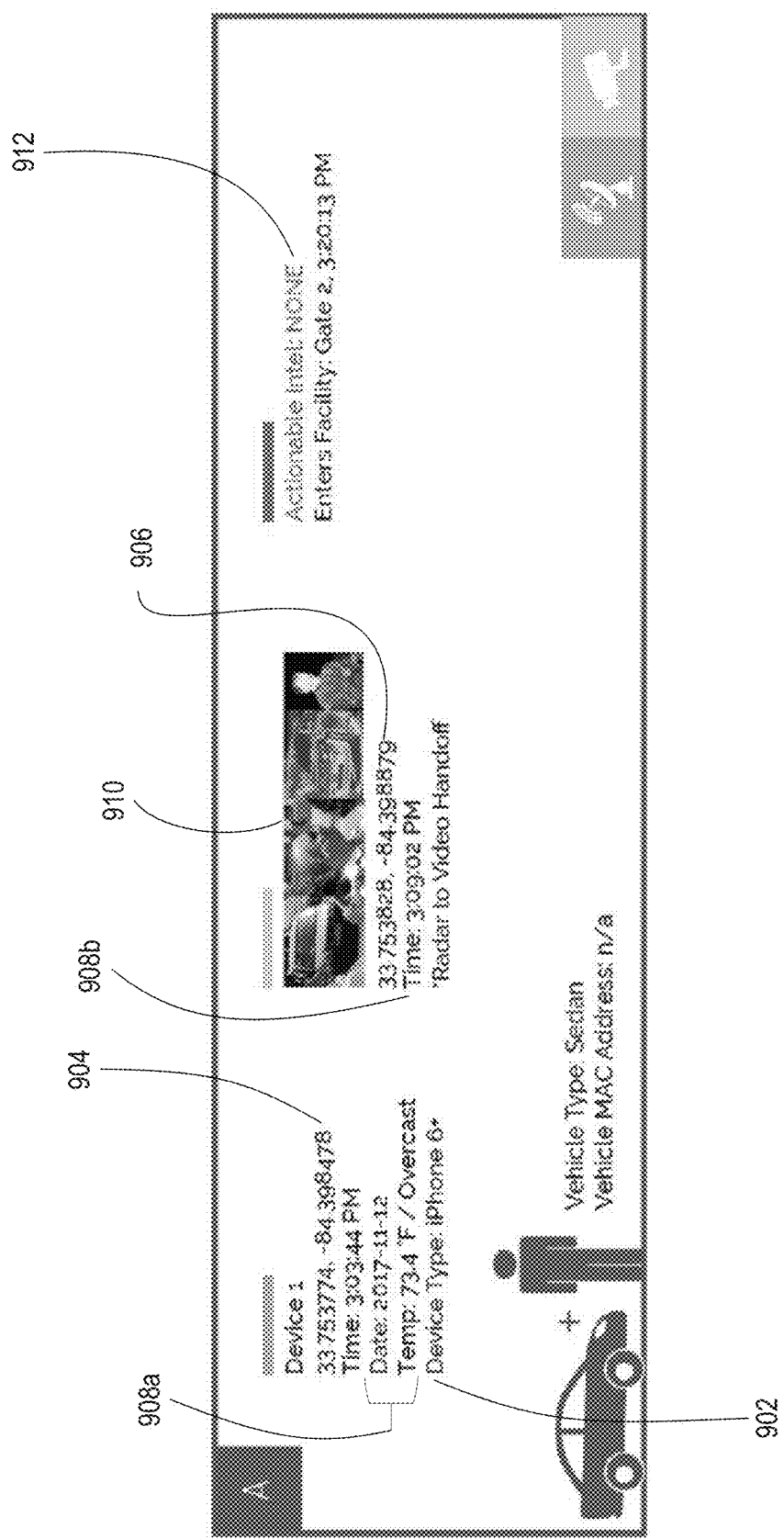
FIGS. 9A to 9D show information obtained by an exemplary security system.

Scenario A: Car (Non-Wi-Fi Enabled) with One Driver and Smartphone; Single Device Scenario As shown in FIG. 9A, a driver in an older, non-Wi-Fi enabled vehicle, without passengers, drives west on a street towards a stadium. The wireless device tracking system pings and determines the driver's mobile device 902 (e.g., iPhone 6 Plus) and determines a location 904 of the mobile device. The camera system may determine a location 906 of the driver associated with the mobile device. The wireless device tracking system and the camera system can operate independently and with each other in real-time to tracks the driver who exits the vehicle on foot. The wireless device tracking system and the camera system may provide a time stamp and/or date stamp 908a, 908b. The camera system may also provide a thermal image 910 of the driver. Based on the received information about the mobile device and/or facial recognition performed on the driver, the security system may determine and/or display that there is no actionable intel 912 for the onsite security personnel.

Figure 9B:
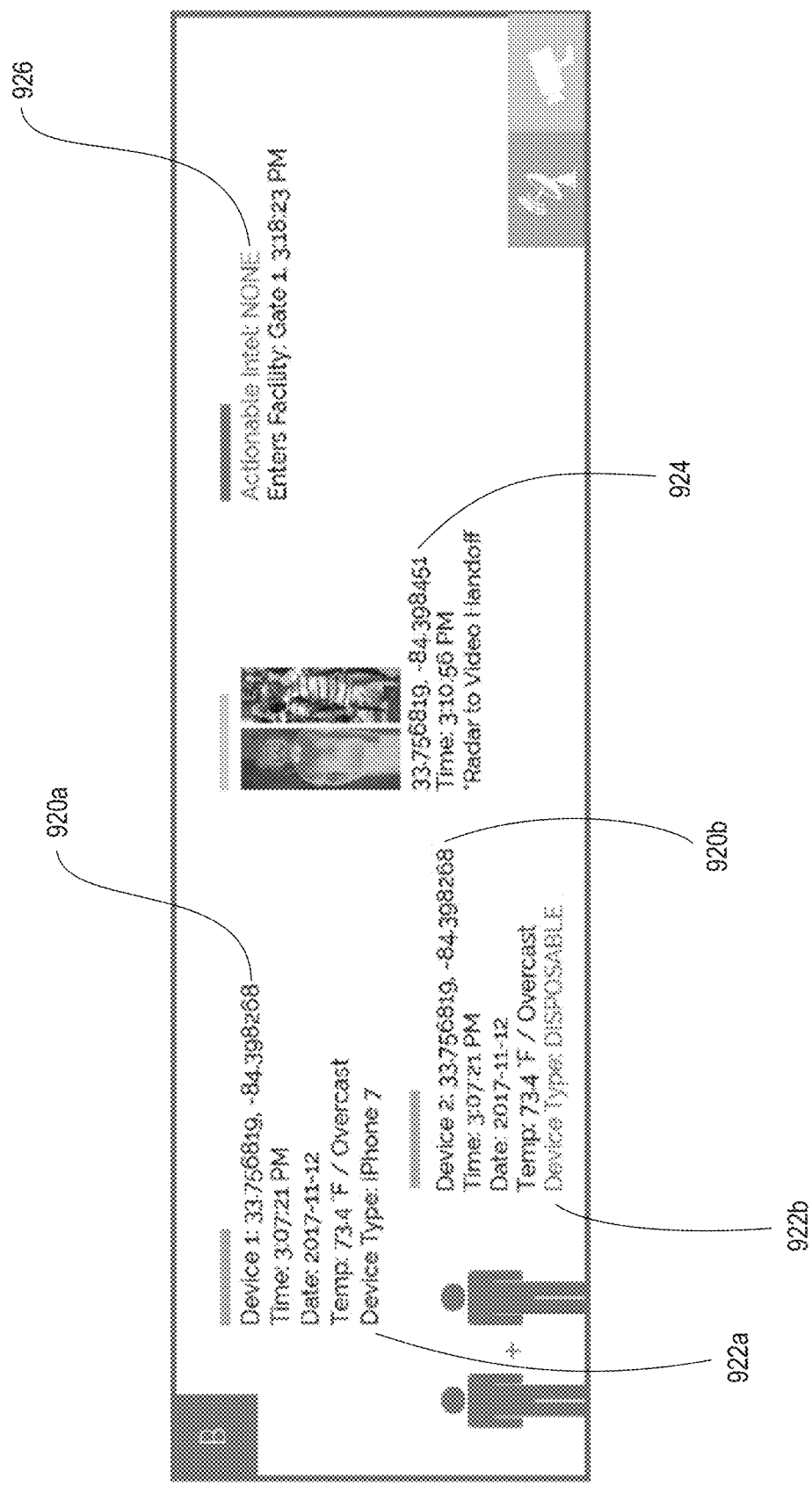

Scenario B: One Pedestrian with One Smartphone and One Disposable Phone; Two Device Scenario A pedestrian in the crowd walks from a parking lot on foot towards a stadium. The wireless device tracking system pings an iPhone 7 device (Device B1) at the same time it pings a disposable phone (Device B2) associated with the pedestrian. The wireless device tracking system obtains the locations 920a, 920b of both mobile devices (shown in FIG. 9B) and determines that they are associated with the same pedestrian. The wireless device tracking system may also determine the identities 922a, 922b of both mobile devices, e.g., "iPhone 7" and "Disposable." The camera system provides a location 924 of the pedestrian carrying the two mobile devices. A server system can determine that the locations 922a, 922b associated with the wireless device tracking system and the location 924 associated with the camera system are the same or close to each other. In some implementations, the system can be operated to indicate that there is no actionable intel 926 to a security personnel, but may continue to track the pedestrian with two devices as he enters the facility at Gate 1.

Figure 9C:
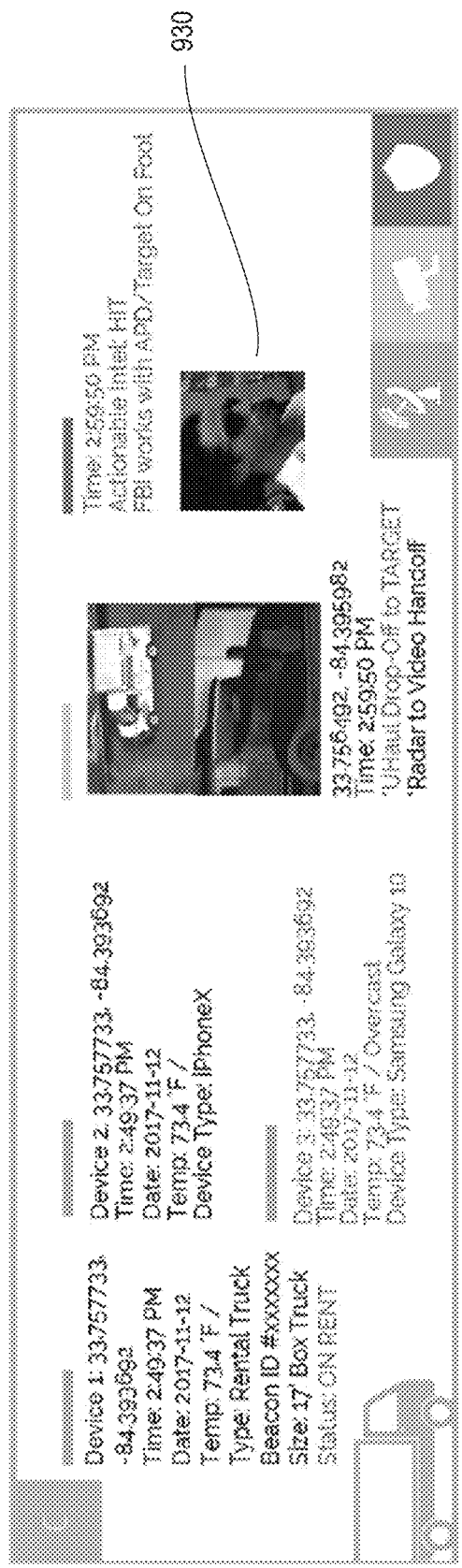

Scenario C: Rental Wi-Fi Enabled Truck, One Driver with Smartphone, One Passenger with Smartphone; Three Device Scenario A driver in a rental truck, with one passenger drives on a street towards a venue. The wireless device tracking system obtains the location and mobile device information, and the camera system obtains the location information associated with the rental truck where the drive and passenger carrying the mobile devices are located. The camera system may determine that the driver has dropped off the passenger, then continues to track both the pedestrian on foot (further described in Scenario D) and the rental truck. The security system tracks the pedestrian as he enters the facility at Gate 1. The facial recognition software associated with the camera system may determine that the facial features of the pedestrian match the facial features of a person on a threat list. The information about the person, along with an image 930 of the person (shown in FIG. 9C) can be presented to onsite security personnel.

Figure 9D:
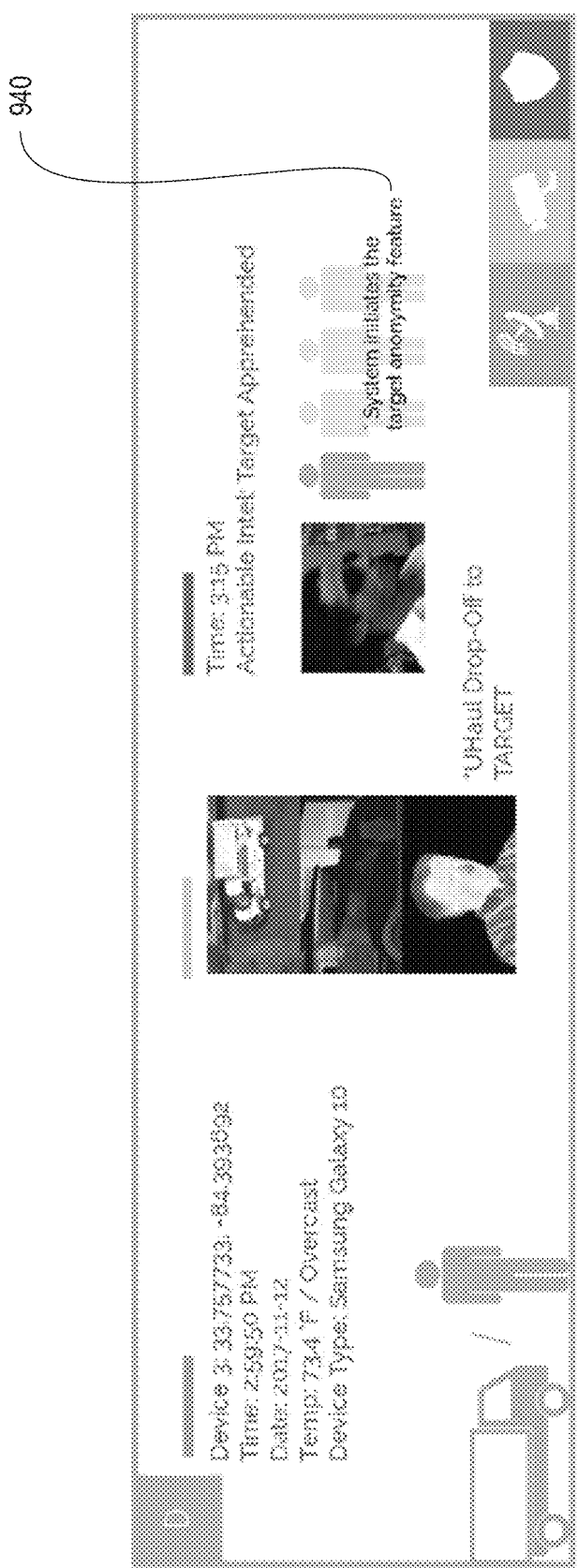

Scenario D: Rental Wi-Fi Enabled Truck, One Driver with Smartphone, One Passenger with Smartphone; Three Device Scenario Continuing with the example from Scenario C, the pedestrian on threat list exits rental truck and the driver continues to drive the rental truck. The wireless device tracking system identifies the driver dropping off the passenger, then continues to track both the pedestrian on foot, and the rental truck. Since the pedestrian has been identified to be on a threat list, the security system may identify the driver as being associated with the pedestrian. Security and law enforcement personnel using the security system described in this patent document, apprehend the driver and the pedestrian. In some implementations, the security system may use anonymity feature 940 described in this patent document and in FIG. 9D to identify two individuals along with the driver and pedestrian in Scenarios C and D.

In this document the term "exemplary" is used to mean "an example of" and, unless otherwise stated, does not imply an ideal or a preferred embodiment.

The disclosed and other embodiments, modules and the functional operations described in this patent document can be implemented in digital electronic circuitry, or in computer software, firmware, or hardware, including the structures disclosed in this patent document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this patent document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described and illustrated, including:

1. A security system to track one or more mobile devices, comprising:
   a telemetry system to transmit and receive wireless signals to track a mobile device;
   a digital system to wirelessly communicate with the tracked mobile device to obtain identification information of the mobile device;
   a camera system to obtain an image of a person carrying the tracked mobile device, wherein the camera system provides a location of the person that appears in a field of view of one or more cameras associated with the camera system;
   a server system in communication with the telemetry system, the digital system, and the camera system, the server system configured to:
      determine, based on the transmitted and received wireless signals, a location of the mobile device at or near a venue;
      process the identification information of the tracked mobile device to determine an attribute associated with a potential suspect;
      obtain, from the camera system, the image of the person carrying the tracked mobile device;
      analyze the obtained image to identify the person as a potential suspect;
      perform a determination, at different instances, that the determined location of the mobile device is same or similar to the location of the person provided by the camera system; and
      track, using the camera system and in response to the determination, the person that continues to appear in the field of view of the one or more cameras.

2. The security system of claim 1, where the server system is configured to determine the location of the mobile device within three feet of actual location of the mobile device.

3. The security system of claim 1, where the server system is configured to analyze the obtained image by performing facial recognition on the image of the person carrying the tracked mobile device.

4. The security system of claim 1, wherein
   the camera system includes thermal cameras to obtain a thermal image of the person, and
   the server system is further configured to analyze the thermal image to detect a weapon located on the person.

5. The security system of claim 1, wherein the server system is further configured to:
   determine that the person is carrying more than one mobile device.

6. The security system of claim 1, wherein the attribute associated with the potential suspect include the tracked mobile device being identified as a disposable device.

7. The security system of claim 1, wherein the mobile device is a Wi-Fi capable device.

8. The security system of claim 1, wherein the identification information of the tracked mobile device includes information obtained from a media access control (MAC) address of the tracked mobile device.

9. The security system of claim 1, wherein
   the telemetry system and digital system are configured to operate in a first security protective zone,
   the camera system is configured to operate in a second security protective zone, and
   the second security protective zone is located inside the first security protective zone.

10. A method of tracking one or more mobile devices, comprising:
   determining, based on transmitted and received wireless signals, a location of a mobile device at or near a venue;
   processing an identification information of the tracked mobile device to determine an attribute associated with a potential suspect;
   obtaining an image of a person carrying the tracked mobile device;
   analyzing the obtained image to identify the person as a potential suspect;
   performing a determination, at different instances, that the determined location of the tracked mobile device is same or similar to a location of the person, wherein the location of the person is obtained when the person appears in a field of view of one or more cameras; and
   tracking, in response to the determination, the person that continues to appear in the field of view of the one or more cameras.

11. The method of claim 10, where the location of the tracked mobile device is determined within three feet of actual location of the tracked mobile device.

12. The method of claim 10, where the obtained image is analyzed by performing facial recognition on the image of the person carrying the tracked mobile device.

13. The method of claim 10, wherein the one or more cameras includes thermal cameras to obtain a thermal image of the person, and
   wherein the method further comprises:
   analyzing the thermal image to detect a weapon located on the person.

14. The method of claim 10, further comprising:
   determining that the person is carrying more than one mobile device.

15. The method of claim 10, wherein the attribute associated with the potential suspect include the tracked mobile device being identified as a disposable device.

16. The method of claim 10, wherein the tracked mobile device is a Wi-Fi capable device.

17. The method of claim 10, wherein the identification information of the tracked mobile device includes information obtained from a media access control (MAC) address of the tracked mobile device.

* * * * *

UNITED STATES PATENT AND TRADEMARK OFFICE
CERTIFICATE OF CORRECTION

PATENT NO. : 10,922,937 B2  
APPLICATION NO. : 16/202010  
DATED : February 16, 2021  
INVENTOR(S) : Julio Jason Dumas Page 1 of 1

It is certified that error appears in the above-identified patent and that said Letters Patent is hereby corrected as shown below:

In the Specification

In Column 11, Line 1, delete "based off of" and insert -- based on --, therefor.

In Column 14, Line 5, delete "movements though" and insert -- movements through --, therefor.

In Column 16, Line 65, delete "config" and insert -- configuration --, therefor.

In Column 27, Lines 65-66, delete "target tracking module 714" and insert -- target tracking module 708 --, therefor.

In Column 29, Line 55, delete "moves though" and insert -- moves through --, therefor.

In Column 32, Line 15, delete "transfer pertinent" and insert -- transfer of pertinent --, therefor.

In Column 32, Line 16, delete "network" and insert -- network. --, therefor.

In Column 34, Lines 13-14, delete "attributed associated" and insert -- attribute associated --, therefor.

In Column 37, Line 43, delete "more them" and insert -- more of them --, therefor.

In the Claims

In Column 40, Line 15, in Claim 10, delete "mobile" and insert -- tracked mobile --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*